United States Patent
Keller et al.

(10) Patent No.: US 10,858,102 B2
(45) Date of Patent: Dec. 8, 2020

(54) CONTAINER RETENTION AND RELEASE APPARATUS FOR USE WITH AIRCRAFT

(71) Applicant: The Boeing Company, Chicago, IL (US)

(72) Inventors: Cory Gordon Keller, St. Charles, MO (US); James V. Eveker, St. Louis, MO (US); Thaddeus Jakubowski, Jr., St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/200,211

(22) Filed: Nov. 26, 2018

(65) Prior Publication Data

US 2020/0164984 A1 May 28, 2020

(51) Int. Cl.
*B64D 1/04* (2006.01)
*B64D 1/10* (2006.01)
*B64D 1/12* (2006.01)

(52) U.S. Cl.
CPC .................. *B64D 1/04* (2013.01); *B64D 1/10* (2013.01); *B64D 1/12* (2013.01)

(58) Field of Classification Search
CPC ... B64D 1/04; B64D 1/06; B64D 1/02; B64D 1/12; B64D 7/08; B64D 1/10
USPC ................ 89/1.53, 1.54, 1.58, 1.59
See application file for complete search history.

(56) References Cited

U.S. PATENT DOCUMENTS

| | | |
|---|---|---|
| 3,181,908 A | 5/1965 | Clark |
| 3,787,012 A | 1/1974 | Jakubowski, Jr. |
| 3,887,150 A | 6/1975 | Jakubowski, Jr. |
| 4,132,147 A | 1/1979 | Contaldo |
| 4,168,047 A * | 9/1979 | Hasquenoph ............ B66C 1/66 244/137.4 |
| 4,187,760 A * | 2/1980 | Holt ......................... B64D 1/04 244/137.4 |
| 4,257,639 A * | 3/1981 | Stock ....................... B64D 7/08 244/137.4 |
| 4,441,674 A | 4/1984 | Holtrop |
| 4,850,533 A | 7/1989 | Hoshi et al. |
| 5,406,876 A | 4/1995 | Harless et al. |
| 5,484,243 A * | 1/1996 | Yacobovitch ............ B64D 1/06 411/353 |
| 5,904,323 A | 5/1999 | Jakubowski, Jr. et al. |
| 7,648,104 B1 | 1/2010 | Jakubowski, Jr. et al. |
| 7,677,501 B1 | 3/2010 | Hundley et al. |
| 2006/0006288 A1* | 1/2006 | Jakubowski, Jr. ....... B64D 1/04 244/137.4 |

* cited by examiner

*Primary Examiner* — Stephen Johnson
(74) *Attorney, Agent, or Firm* — Hanley, Flight & Zimmerman, LLC

(57) ABSTRACT

Container retention and release apparatus are disclosed. An example container retention and release apparatus includes a swaybrace to engage an exterior surface of a container. A latch is to attach to an internal receptacle of the container to retain the container. The latch is movable between a latched position to retain the container and an unlatched position to release the container. A drive is to move the latch between the latched position and the unlatched position.

24 Claims, 20 Drawing Sheets

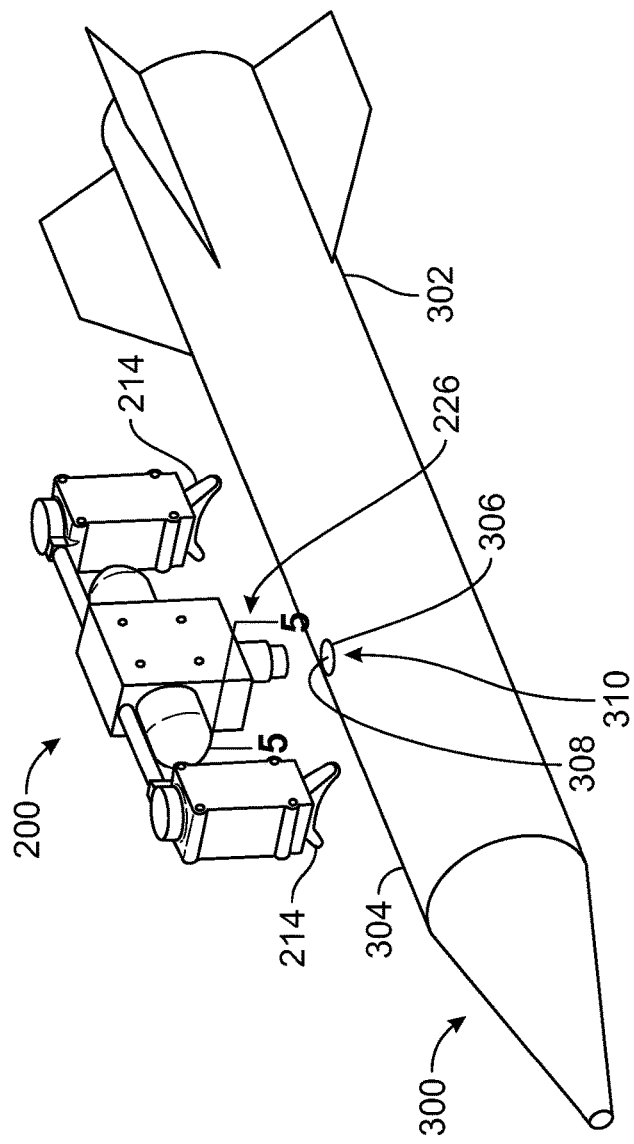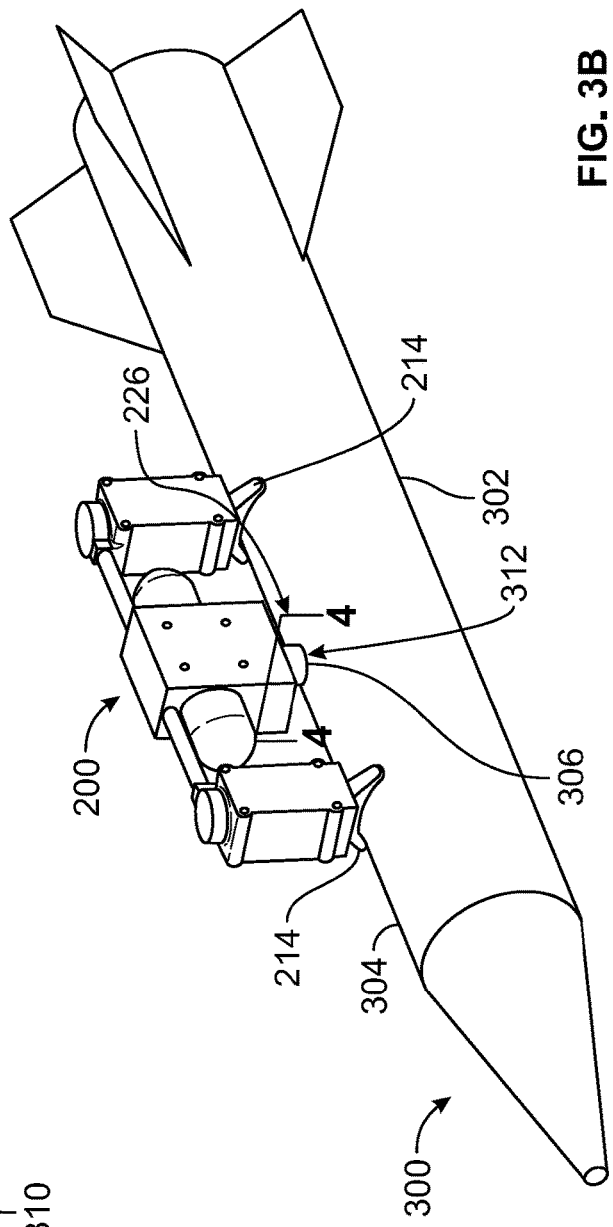
FIG. 3A
FIG. 3B

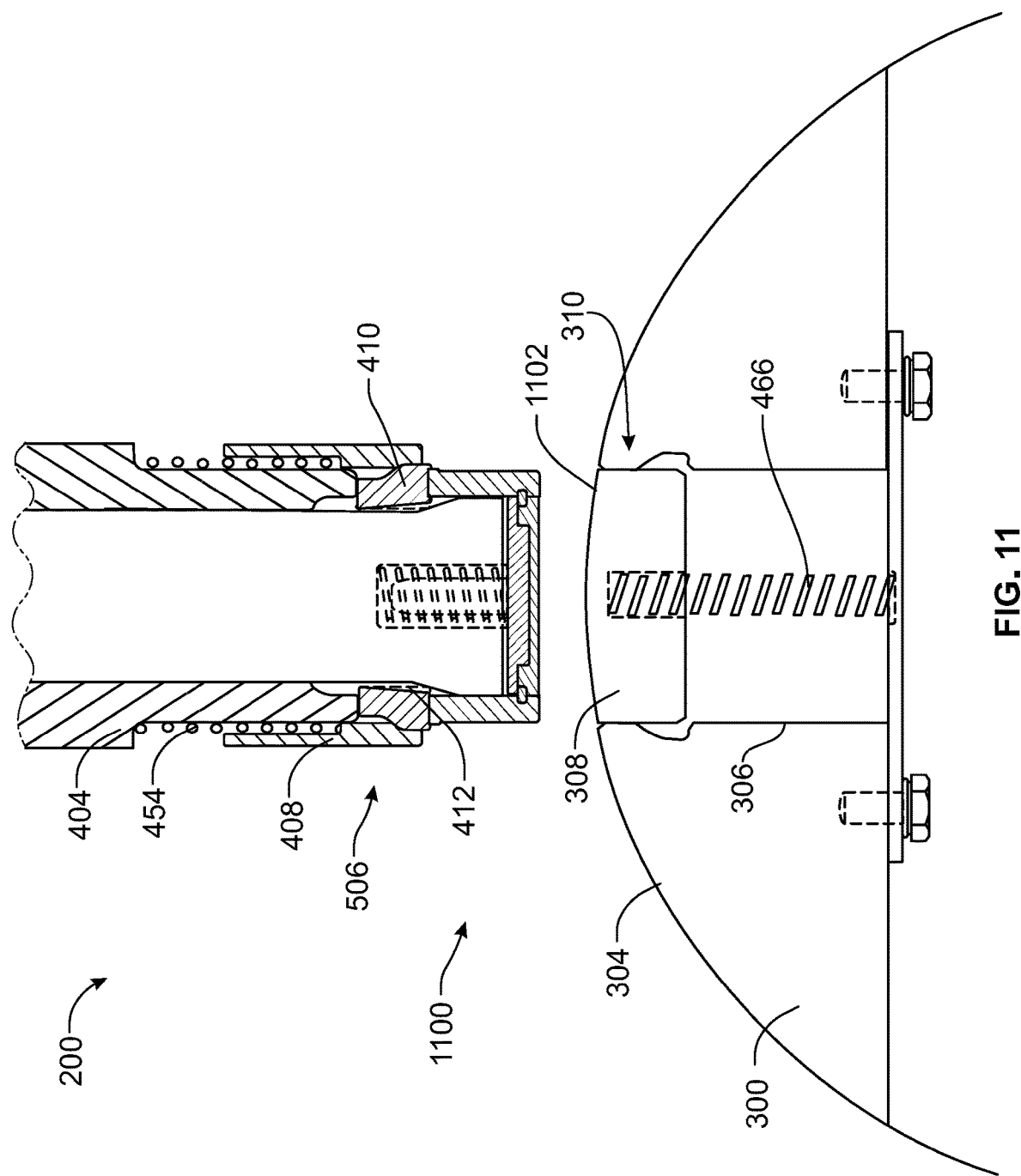

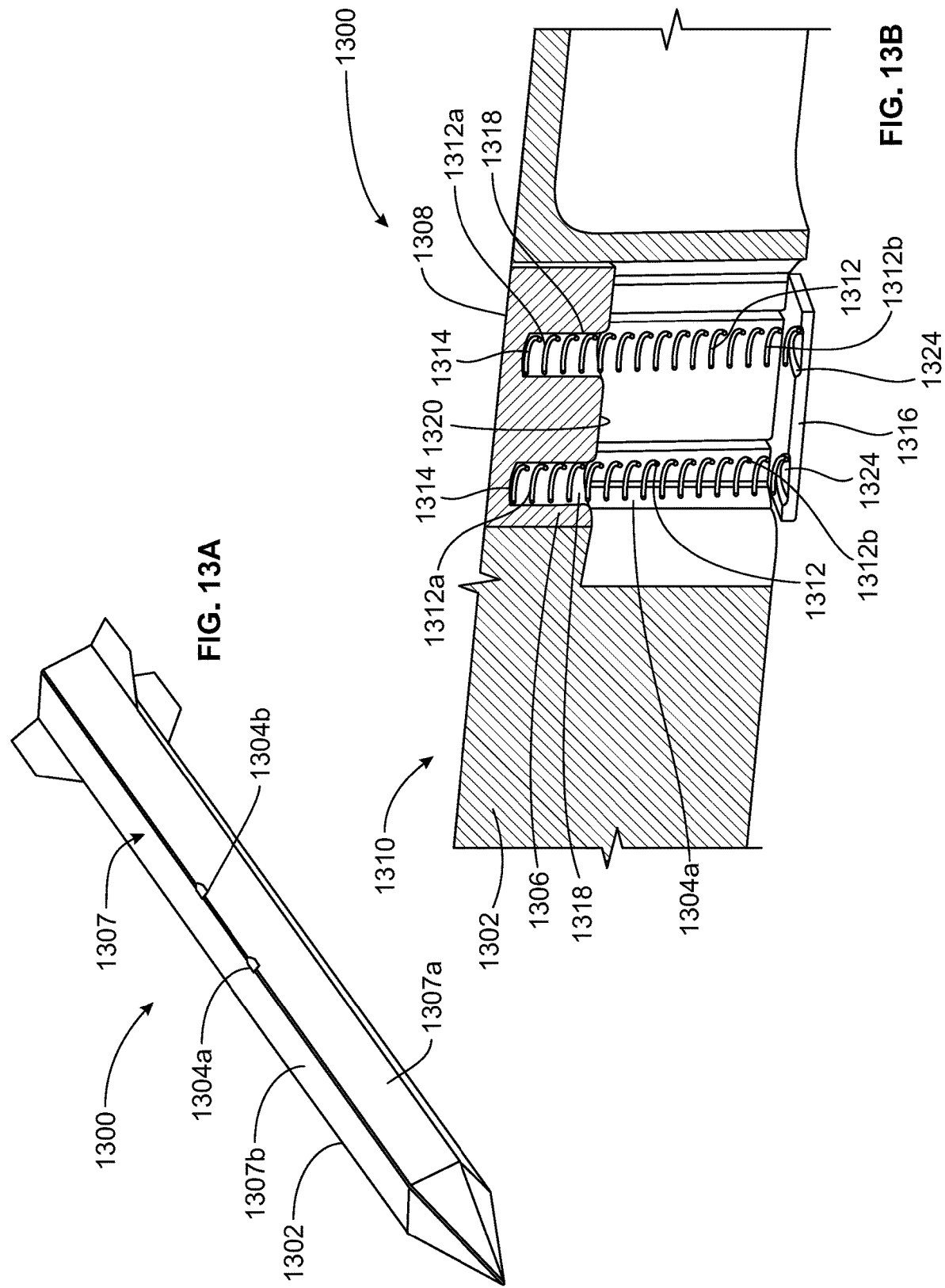

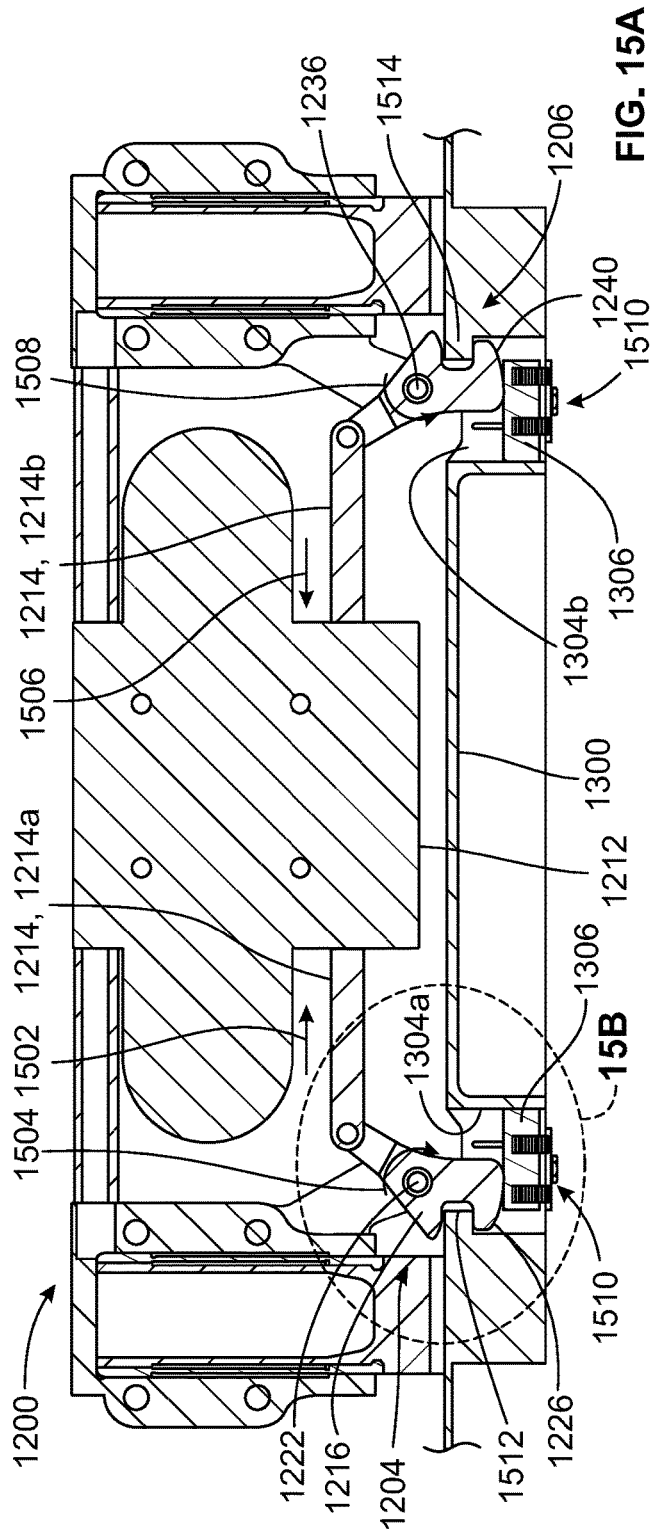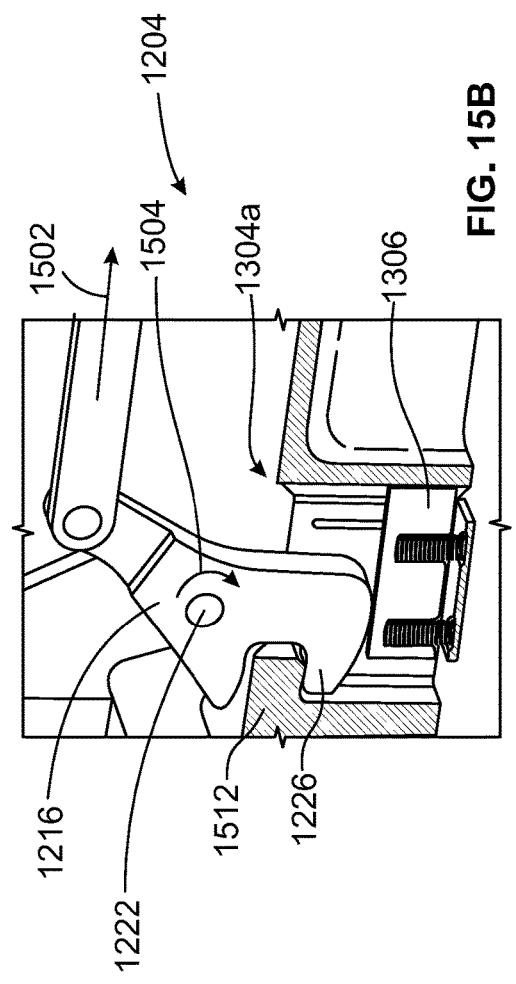
FIG. 15A
FIG. 15B

CONTAINER RETENTION AND RELEASE APPARATUS FOR USE WITH AIRCRAFT

FIELD OF THE DISCLOSURE

This disclosure relates generally to aircraft and, more particularly, to container retention and release apparatus for use with aircraft.

BACKGROUND

When suspending disposable containers (e.g., a weapon, a payload, a cargo container, etc.) from aircraft, it is desirable to provide suitable chocks or swaybraces to steady the containers while carrying the containers in flight to the point at which the container is released. Military aircraft that are used to dispense bombs, rockets, and other stores in flight usually include racks located beneath the wings and/or fuselage, or in weapon bays designed to release the stores upon command. Commercial aircraft that are used to dispense containers in flight usually include a retention and/or release system located beneath the fuselage (e.g., a belly of the fuselage).

SUMMARY

In some examples, an example container retention and release apparatus includes a swaybrace to engage an exterior surface of a container. A latch is to attach to an internal receptacle of the container to retain the container. The latch is movable between a latched position to retain the container and an unlatched position to release the container. A drive is to move the latch between the latched position and the unlatched position.

In some examples, a container retention and release apparatus includes a swaybrace to engage an exterior surface of a container. A post is to be at least partially received by an internal receptacle of the container. A lock is carried by the post. The lock being movable between a latched position to retain the container and an unlatched position to release the container. A piston is slidably coupled relative to the post. The piston moves the lock between the latched position and the unlatched position.

In some examples, a method includes retaining a container to a container retention and release apparatus by engaging an exterior of a container via a swaybrace and engaging a shoulder of an internal receptacle of the container via a latch spaced from the swaybrace; and releasing the container by moving the latch from a latched position at which the latch engages the shoulder of the internal receptacle of the container and an unlatched position at which the latch is disengaged from the shoulder of the internal receptacle.

In some examples, a container retention and release apparatus includes a swaybrace to engage an exterior surface of a container. A first latch is to be at least partially received by a first internal receptacle of the container, and a second latch is to be at least partially received by a second internal receptacle of the container.

BRIEF DESCRIPTION OF THE DRAWINGS

FIG. 3A is a perspective view of an example container that can be retained by the example container retention and release apparatus of FIGS. 2A and 2B.

FIG. 3B is a perspective view of the example container retention and release apparatus of FIGS. 2A and 2B coupled to the example container of FIG. 3A.

FIGS. 9-11 illustrate an example sequence of unlatching the example container retention and release apparatus of FIGS. 2A, 2B, 3A and 3B.

FIG. 13A is a perspective view of an example container that can be carried by the example container retention and release apparatus of FIGS. 10A and 10B.

FIG. 13B is a partial, cross-sectional enlarged view of the example container of FIG. 13A.

FIG. 15A is a cross-sectional view taken along line 15A-15A of FIG. 14B.

FIG. 15B is an enlarged, partial perspective view of the example container and the example container retention and release apparatus of FIG. 15A.

Figure 1A:
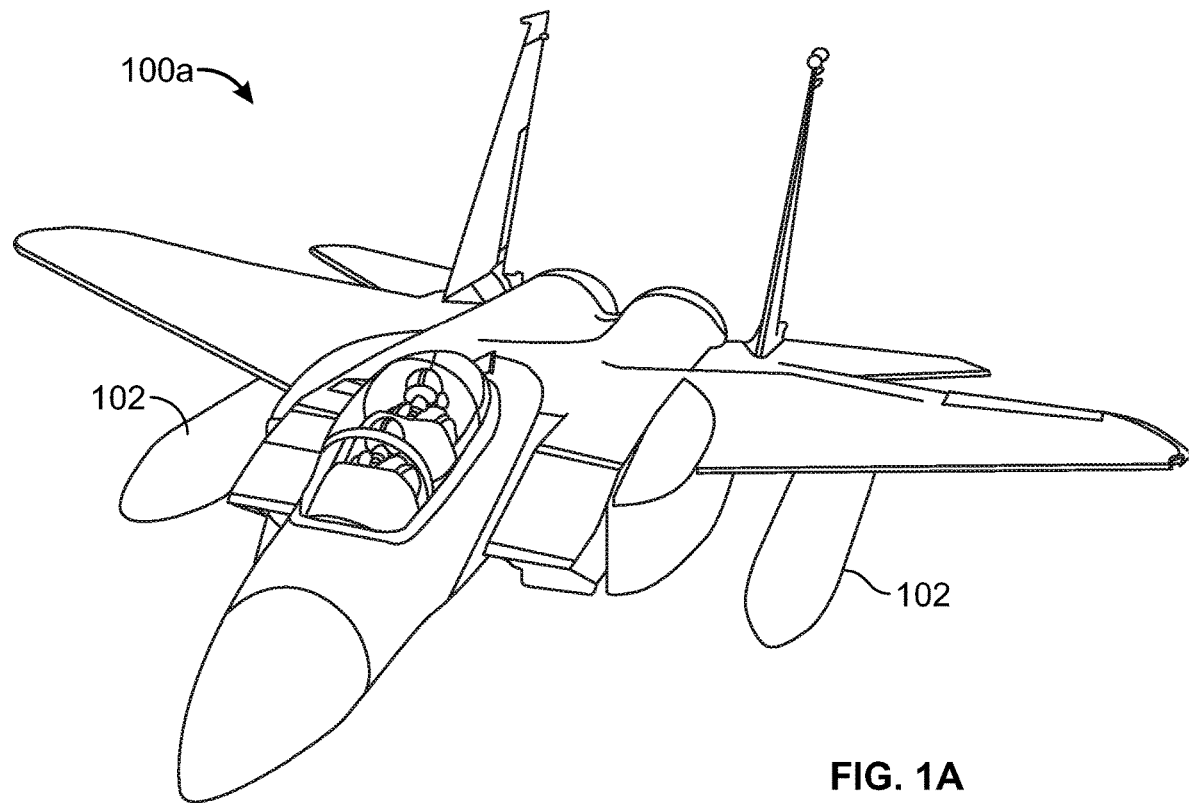
FIG. 1A is a perspective view of an example aircraft that can be implemented with an example container retention and release apparatus disclosed herein.

Certain examples are shown in the above-identified figures and described in detail below. The figures are not necessarily to scale and certain features and certain views of the figures can be shown exaggerated in scale or in schematic for clarity and/or conciseness. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

Containers (e.g., stores, weapons, missiles, etc.) can be attached to and released from an aircraft. Containers can be used to carry munitions or other material (e.g., bombs, rockets, missiles, rations, etc.) to be dropped from the aircraft upon command. To carry and dispense containers upon command, aircraft often employ container retention and release apparatus (e.g., bomb racks) located beneath the wings and/or fuselage.

However, when coupled beneath the wings and/or fuselage, containers (e.g., missiles) can be exposed to many sources of mechanical vibration that can affect system reliability, safety, and mission effectiveness. One of the most significant exposures to vibration occurs when a missile is being carried by an aircraft (e.g., a military aircraft, a helicopter) or other aviation platform, which is a condition known as captive carry.

Some known container ejector apparatus employ hooks and/or other retention apparatus to hold the container in captive carry flight. Additional structural contact points within the container are often needed for swaybraces and/or retainers to constrain the container in captive carry flight. For example, the containers typically include protruding lugs, hangers, and/or other fasteners that provide the container attachment points that couple with the swaybraces and/or other retainers to constrain the container. However, the protruding lugs, hangers, and/or other retention contact points result in aerodynamic drag on the container (e.g., missile) after release of the container from the host aircraft that reduces container performance (e.g., a flight range of a missile). The separate lugs/hangers and/or swaybrace contact points add structural weight to the container and reduce available volume for payload within the container. To engage a hook mechanism of a conventional container retention and release apparatus, a container is accurately positioned or aligned (e.g., vertically) relative to the container retention and release apparatus. Some containers (e.g., weapons) include foldable lugs to mitigate the aerodynamic and/or detectability penalty due to protruding lugs or hangers. However, the use of foldable lugs results in loss of internal volume in a container, increased weight of the container, increased difficulty of loading the container on an aircraft, and/or can cause additional difficulties for a container loading crew. Additionally, most conventional container retention and release apparatus do not control roll and/or yaw of a container during ejection of the container. Some known container ejector apparatus incorporate a constrained container release system that reduces container yaw during ejection. However, there may be a need to improve the ejector apparatus and enhance effective departure of the container (e.g., to improve accuracy of an intended trajectory).

Example container retention and release apparatus (e.g., bomb rack) disclosed herein retain and release a captively carried container in-flight. To retain and release a container, example container retention and release apparatus disclosed herein employ a swaybrace an example internal attach retention and release apparatus (e.g., a collet) to interface with an internal receptacle (or receptacles) of a container (e.g., a store, a weapon, etc.). Example retention apparatus disclosed herein are spaced from the swaybrace that is to interface with an internal receptacle of a container. Example retention and release apparatus disclosed herein can be fixed to, or integrally formed with, an actuator (e.g., an actuation member such as a piston, a diaphragm, etc.). Further, example internal attach retention and release apparatus disclosed herein eliminate the need to provide protruding lugs, hangers, and/or attach points that would otherwise protrude from an outer surface of a container. For example, example retention apparatus (e.g., a bomb rack) disclosed herein interface with one or more receptacles of a container internal to an outer mold line (OML) of the store or container. In this manner, the container retention and release apparatus disclosed herein enable a container to have a smooth aerodynamic surface (e.g., a smooth outer surface) without external protrusions such as lugs or hangers. Additionally, in some cases a single retention apparatus could be used and eliminate additional frames in the container for lugs or hangers, thereby reducing container weight and increasing internal volume available for payload. In some instances, example containers disclosed herein employ a door or cover that closes the internal receptacle to improve aerodynamic performance of the container.

Figure 1B:
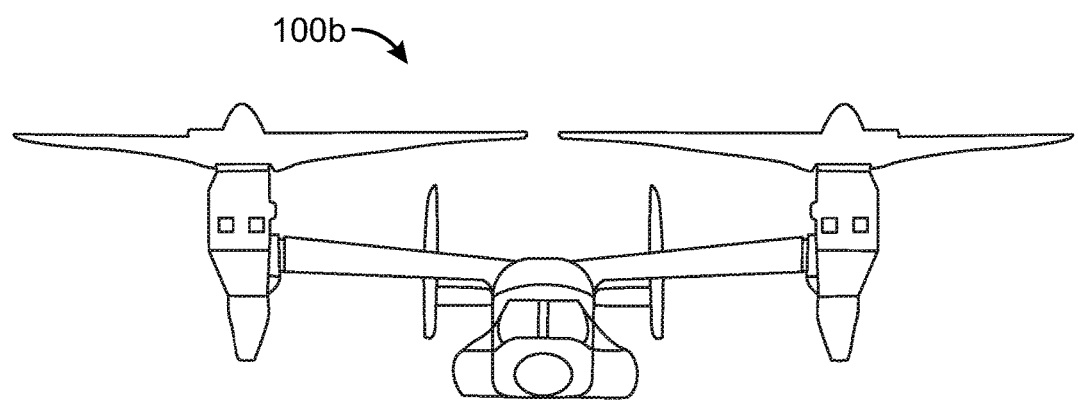
FIG. 1B is a front view of an example commercial aircraft that can be implemented with an example container retention and release apparatus disclosed herein.

FIG. 1A is an aircraft 100a that can be implemented with an example container retention and release apparatus constructed in accordance with teachings of this disclosure. For example, the aircraft 100a of FIG. 1A can implement the example container retention and release apparatus disclosed herein to retain and/or release a container 102 (e.g., a store, a weapon, a missile, etc.) of the aircraft 100a of FIG. 1A. The example teachings disclosed herein are not limited to the aircraft 100a of FIG. 1A. FIG. 1B is another aircraft 100b that can implement example container retention and release apparatus disclosed herein. For example, the aircraft 100b of FIG. 1B is a commercial aircraft that can be used to deliver pods and/or other cargo. In some examples, the aircraft 100b of FIG. 1B can be an autonomous aircraft such as, for example, an unmanned aerial vehicle (i.e., a drone). In some examples, the container retention and release apparatus disclosed herein can be implemented with other types of aircraft such as, for example, vertical takeoff and landing aircraft, military aircraft, helicopters, drones, commercial aircraft, and/or any other type of aircraft.

Figure 2A:
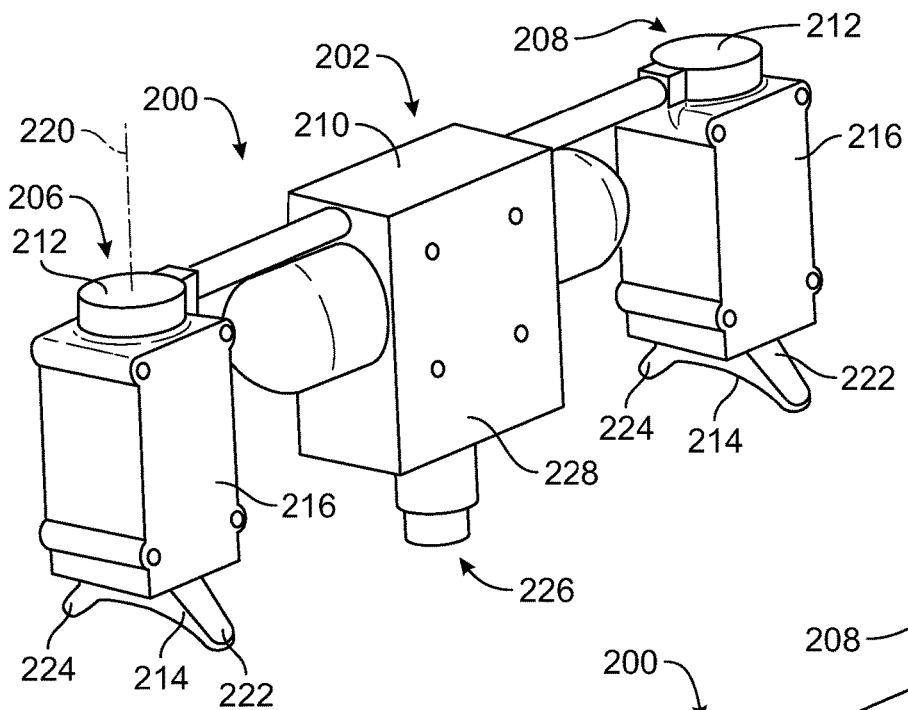
FIG. 2A is a perspective view of an example container retention and release apparatus disclosed herein shown in a stored position.
Figure 2B:
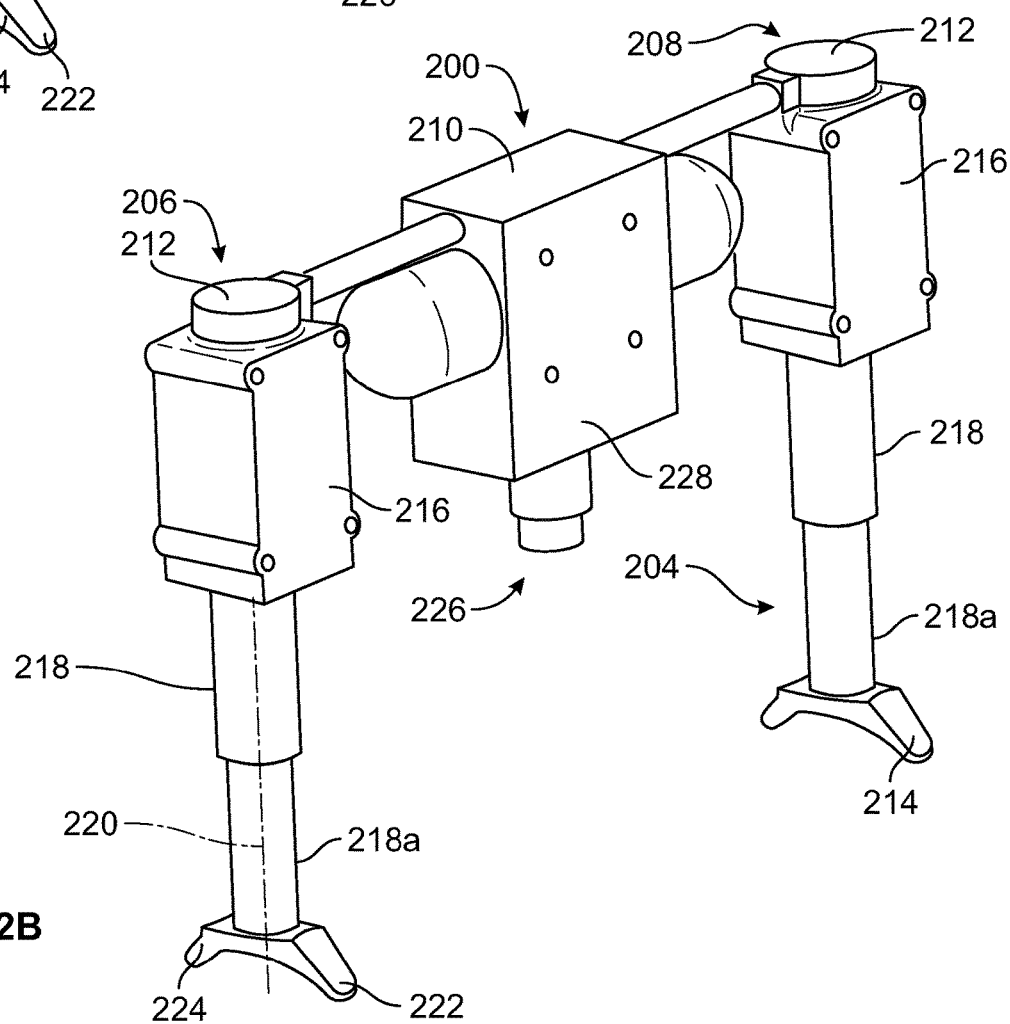
FIG. 2B is a perspective view of a second side of an example container retention and release apparatus of FIG. 2A shown in a deployed position.

FIGS. 2A and 2B are perspective views of an example container retention and release apparatus 200 disclosed herein. FIG. 2A is a perspective view of the example container retention and release apparatus 200 shown in a stored position 202. FIG. 2B is a perspective view of the example container retention and release apparatus 200 shown in a deployed position 204. The example container retention and release apparatus 200 disclosed herein can implement a bomb rack of the aircraft 100a of FIG. 1A or a container delivery system of the aircraft 100b of FIG. 1B. The example container retention and release apparatus 200 retains a container in the stored position 202 and releases the container in deployed position 204.

The container retention and release apparatus 200 of the illustrated example includes a first ejector assembly 206, a second ejector assembly 208, and an energy source 210. The energy source 210 of the illustrated example can be a pneumatic energy source, a hydraulic energy source, a pyrotechnic energy source and/or any other energy source to provide energy to actuate the first ejector assembly 206 and the second ejector assembly 208. The first ejector assembly 206 and the second ejector assembly 208 move together (e.g., synchronously) upon activation of the energy source 210 to release a container. The second ejector assembly 208 is identical (e.g., a mirror image) in both structure and function to the first ejector assembly 206. For brevity and clarity, the first ejector assembly 206 will be discussed in conjunction with the second ejector assembly 208. Each of the first ejector assembly 206 and the second ejector assembly 208 constrains and releases a container. The first and second ejector assemblies 206 and 208 impart energy to the container during release to eject the container.

To constrain and/or release a container, the first ejector assembly 206 includes an actuator 212 and a swaybrace 214. The actuator 212 includes a cylinder 216 and a piston 218 (FIG. 2B) movably (e.g., slidably) coupled relative to the cylinder 216. The piston 218 moves relative to the cylinder 216 in a rectilinear direction along a longitudinal axis 220 of the piston 218. The swaybrace 214 is coupled (e.g., fixed relative) to a first end 218a of the piston 218. For example, the swaybrace 214 can be integrally formed with the piston 218 or coupled to the piston 218 via welding, a fastener (e.g., a screw, a pin, etc.) and/or otherwise fastened or connected to the piston 218. The swaybrace 214 includes a first leg 222 and a second leg 224. The swaybrace 214 is a unitary structure defining the first leg 222 and the second leg 224. However, in some examples, the swaybrace 214 can be multiple structures (e.g., a two-piece structure) defining the first leg 222 and the second leg 224.

To constrain (e.g., restrict or prevent movement) a container when the container retention and release apparatus 200 is in the stored position 202, the container retention and release apparatus 200 includes a retention apparatus 226. As described in greater detail below, the retention apparatus 226 is movable between a first or latched position (e.g., an unlatched position 500 of FIG. 5) to retain the container and a second or unlatched position (e.g., a latched position 800 of FIG. 8) to release the container. To move the retention apparatus 226 between the latched position and the unlatched position, the container retention and release apparatus 200 includes a drive system 228. The drive system 228 can be a pneumatic system, a hydraulic system and/or any other system and/or can receive energy from the energy source 210 and/or another energy source.

As noted above, the second ejector assembly 208 is identical to the first ejector assembly 206. The second ejector assembly 208 includes a cylinder 216 (e.g., a second cylinder), a piston 218 (e.g., a second piston), a swaybrace 214 that includes a first leg 222 (e.g., a third leg) and a second leg 224 (e.g., a fourth leg). The first ejector assembly 206 and the second ejector assembly 208 of the illustrated example operate together to move a container between the stored position 202 and the deployed position 204.

FIG. 3A is a perspective view of a container 300 that can be retained by the container retention and release apparatus 200 of FIGS. 2A and 2B. The container 300 of the illustrated example is a store or weapon (e.g., the container 102 of FIG. 1). The container 300 includes a body 302 having a cylindrical shape. An outer surface 304 of the body 302 of container 300 has a smooth profile and does not include lugs, fasteners, receptacles or other attachment points that can otherwise affect an aerodynamic characteristic (e.g., performance) of the container 300 when the container 300 is released from the container retention and release apparatus 200. The body 302 of the illustrated example includes an opening 306 (e.g., an internal receptacle or bore internal to the OML) to receive the retention apparatus 226. The body 302 portion supporting the opening 306 is reinforced (e.g., has a greater thickness or greater amount of material).

The container includes a cover 308 located in the opening 306. The cover 308 is movably coupled relative to the body 302 of the container 300. The cover 308 is in a closed position 310 when the container 300 is released from the container retention and release apparatus 200. In the closed position 310, the cover 308 is flush relative to the outer surface 304 (e.g., an exterior surface) of the body 302 so that the opening 306 does not affect an aerodynamic characteristic (e.g., performance) of the container 300 when released from the container retention and release apparatus 200. In some examples, the cover 308 is not provided with the container 300. In some examples, the opening 306 and/or the cover 308 can be coated with a radar absorbent material to reduce detectability by radar.

FIG. 3B is a perspective view of the example container retention and release apparatus of FIGS. 2A and 2B coupled to the container 300 of FIG. 3A. When the container 300 is coupled to the container retention and release apparatus 200, the swaybrace 214 engages the outer surface 304 of the container 300. For example, the swaybrace 214 engages an outer mold line (OML) of the container 300. Additionally, the opening 306 receives the retention apparatus 226 and moves the cover 308 (FIG. 3A) to an open position 312. For example, the retention apparatus 226 engages the container 300 at an interior of the OML.

Figure 4:
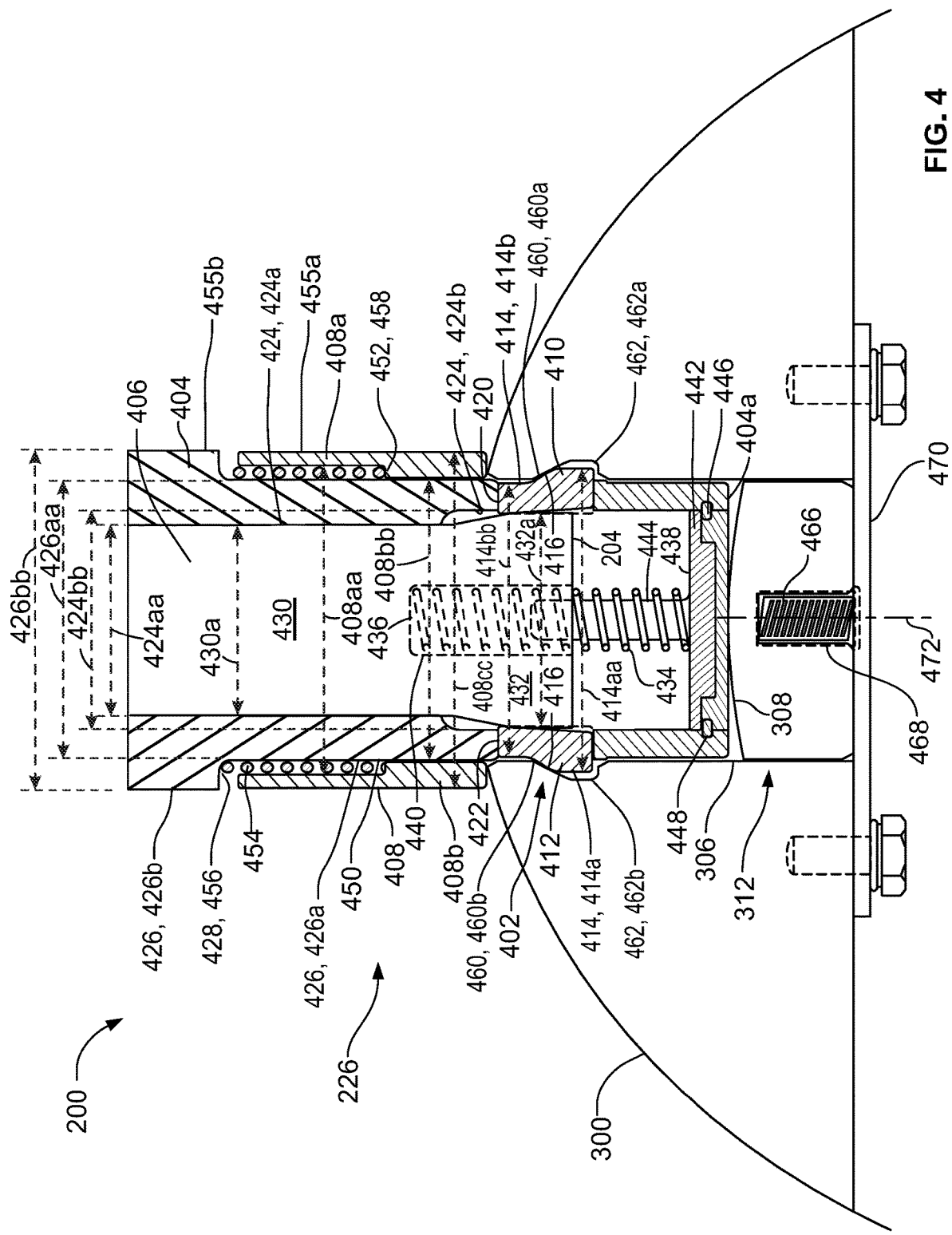
FIG. 4 is a cross-sectional view of the example container retention and release apparatus of FIG. 3A taken along line 4-4 of FIG. 3B.
Figure 5:
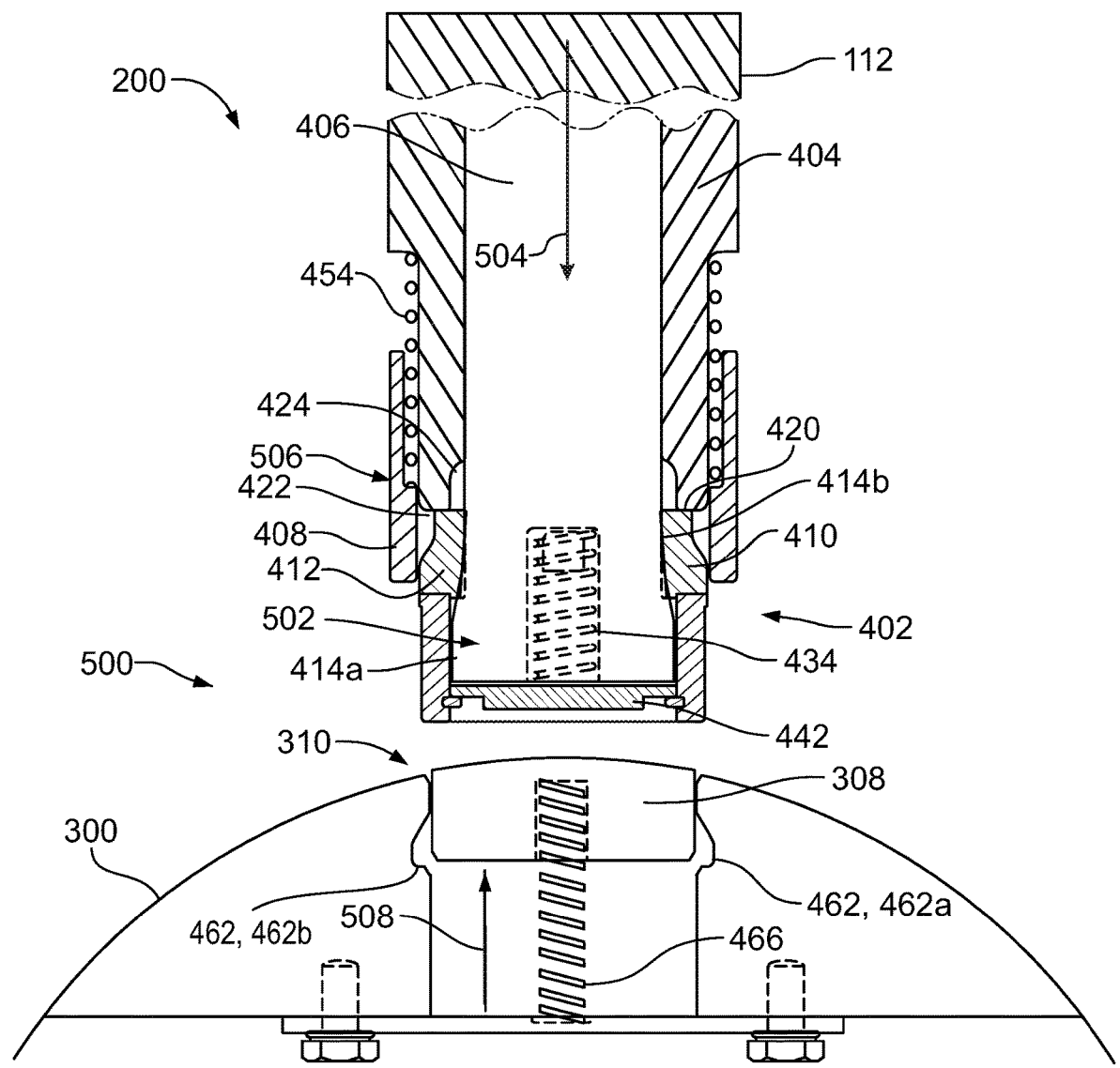
FIGS. 5-8 illustrate an example sequence of latching the example container retention and release apparatus of FIGS. 2A, 2B, 3A and 3B.

FIG. 4 is a cross-sectional view of the example container retention and release apparatus 200 taken along line 4-4 of FIG. 3B. The retention apparatus 226 of the illustrated example includes a lock 402, a post 404, a piston 406 and a collar 408. The lock 402 of the illustrated example is movable between the latched position 800 (FIG. 8) and the unlatch position 500 (FIG. 5). The lock 402 of the illustrated example includes a first lock 410 and a second lock 412. The first lock 410 and the second lock 412 are identical. Each of the first lock 410 and the second lock 412 includes a body 414 defining a shoulder 416. The shoulder 416 is formed by an enlarged portion 414a of the body 414 having a first dimension 414aa (e.g., a first outer diameter) and a reduced portion 414b of the body 414 having a second dimension 414bb (e.g., a second outer diameter) that is smaller than the first dimension 414aa.

The lock 402 of the illustrated example is carried by the post 404. To carry the lock 402, the post 404 includes a first slot 420 (e.g., a first gap) to receive the first lock 410 and a second slot 422 (e.g., a second gap) to receive the second lock 412. To receive the piston 406, the post 404 includes a bore 424 (e.g., a cavity). A first portion 424a (e.g., an upper portion) of the bore 424 has a first inner dimension 424aa (e.g., a first diameter) and a second portion 424b (e.g., a lower portion) of the bore 424 has a second inner dimension 424bb (e.g., a second diameter) different than (e.g., greater than) the first inner dimension 424aa. An outer surface 426 of the post 404 includes a first outer portion 426a (e.g., an upper portion) that has a first outer dimension 426aa (e.g., a third diameter) and a second outer portion 426b (e.g., a lower portion) that has a second outer dimension 426bb (e.g., fourth diameter) different than (e.g., less than) the first outer dimension 426aa to define a first shoulder 428 (e.g., an outer shoulder or seat). The post 404 is a cylindrically shaped body (e.g., a shaft). However, in other examples, the post 404 can have polygonal shaped body and/or any other shaped body to correspond with a shape of the opening 306 of the container 300.

To move the lock 402 between the latched position and the unlatched position, the retention apparatus 226 includes the piston 406. Specifically, the piston 406 is slidably coupled to the post 404 via the bore 424. The piston 406 includes a body 430 (e.g., a cylindrical body or shaft) and a piston head 432. The piston head 432 of the illustrated example has a first dimension 432a (e.g., a first diameter) that is greater than a second dimension 430a (e.g., a second diameter) of the body 430. Thus, the piston head 432 has an enlarged portion (e.g., an end) compared to the body 430. The piston 406 is a cylindrically shaped body (e.g., a shaft). However, in other examples, the piston 406 can have polygonal shaped body and/or any other shaped body to correspond with a shape of the bore 424 of the post 404. In other examples, the body 430 can have a first shape (e.g., a cylindrical shape) and the piston head 432 can have a second shape (e.g., a polygonal shape) different than the first shape of the body 430. In some examples, an inner surface or shape of the post 404 formed by the bore 424 has a shape (e.g., a cross-sectional shape) corresponding (e.g., similar or complementary) to a shape (e.g., a cross-sectional shape) of an outer surface or shape of the piston 406.

To bias the piston 406, the retention apparatus 226 includes a piston biasing element 434 (e.g., a coil spring). The piston biasing element 434 is positioned between a first spring seat 436 and a second spring seat 438. The first spring seat 436 is defined by an aperture 440 (e.g., a cavity) formed in the piston head 432 and the second spring seat 438 is defined by a support plate 442 (e.g., a cover). To guide and/or support the piston biasing element 434, the support plate 442 includes a support stem 444. Specifically, the piston biasing element 434 is coaxial with the support stem 444. The support stem 444 of the illustrated example protrudes from the support plate 442 toward the piston 406. When coupled to the post 404, the aperture 440 of the piston head 432 at least partially receives the support stem 444 (e.g., when the retention apparatus 226 is in a latched position). The second spring seat 438 is positioned adjacent (e.g., at) an end 404a (e.g., a lower or bottom end) of the post 404. In this example, a retainer 446 (e.g., a retaining ring) is positioned in a groove 448 of the post 404 to couple the support plate 442 to the post 404. In some examples, the retainer 446 can be a locking ring, a pin, and/or any other fastener that fixes the support plate 442 to the post 404.

To retain the lock 402 with the post 404 when the retention apparatus 226 is in an unlatched position and removed from the opening 306 of the container 300, the retention apparatus includes the collar 408. The collar 408 is slidably coupled to the post 404. Specifically, the collar 408 of the illustrated example is slidably coupled to an outer surface 450 of the first outer portion 426a of the post 404. The collar 408 includes a first portion 408a having a first dimension 408aa (e.g., a first inner diameter) and a second portion 408b having a second dimension 408bb that is different (e.g., less than) the first dimension 408aa to define a second shoulder 452. The second dimension 408bb is substantially similar to (e.g., less than 2% greater than) the second outer dimension 426bb of the post 404. Thus, the collar 408 moves along the first outer portion 426a of the post 404.

To bias the collar 408 toward the lock 402 to retain the lock 402, the collar 408 of the illustrated example includes a collar biasing element 454 (e.g., a coiled spring). The collar biasing element 454 is positioned between a first spring seat 456 defined by the first shoulder 428 of the post 404 and a second spring seat 458 defined by the second shoulder 452 of the collar 408. The collar biasing element 454 surrounds the first outer portion 426a of the post 404. The collar 408 includes a third dimension 408cc (e.g., an outer diameter) that is substantially similar to (e.g., within 10 percent of) the second outer dimension 426bb of the second outer portion 426b of the post 404. Thus, an outer surface 455a of the collar 408 is substantially flush relative to an outer surface 455b of the second outer portion 426b of the post 404. The collar 408 is a cylindrically shaped body (e.g., a shaft). However, in other examples, the collar 408 can have polygonal shaped body and/or any other shaped body to correspond with a shape of the first outer portion 426a. In some examples, an inner surface or shape of the post 404 formed by the bore 424 has a shape (e.g., a cross-sectional shape) corresponding (e.g., similar or complementary) to a shape (e.g., a cross-sectional shape) of an outer surface or shape of the piston 406.

To constrain the container 300, the retention apparatus 226 is at least partially inserted in the opening 306. In the opening 306, the lock 402 interfaces with the container 300. To interface with the lock 402, the container 300 of the illustrated example includes a protrusion 460 (e.g., a shoulder) formed in the opening 306 via a recess 462. The recess 462 receives the enlarged portion 414a of the body 414, and the protrusion 460 engages the reduced portion 414b of the body 414. For example, a first recess 462a receives the enlarged portion 414a of the first lock 410 and a first protrusion 460a engages the reduced portion 414b of the first lock 410. A second recess 462b receives the enlarged portion 414a of the second lock 412 and a second protrusion 460b engages the reduced portion 414b of the second lock 412.

To bias the cover 308 toward the closed position 310 when the retention apparatus 226 is removed from the opening 306, the container 300 includes a cover biasing element 466 (e.g., a coil spring). The cover biasing element 466 is positioned within an aperture 468 (e.g., a hole or bore) The cover biasing element 466 and the cover 308 are coupled to the container 300 via a plate 470.

In the illustrated example, the lock 402 includes the first lock 410 and the second lock 412. However, in other examples, the lock 402 includes a plurality of locks (e.g., four locks, six locks, etc.) radially spaced relative to a longitudinal axis 472 and the post 404 includes a corresponding plurality of slots (e.g., four locks, six locks, etc.) radially spaced relative to the longitudinal axis 472 to receive the corresponding locks. Additionally, the container retention and release apparatus 200 of the illustrated example includes one of the retention apparatus 226. However, in other examples, the container retention and release apparatus 200 includes a plurality of retention apparatus 226 (e.g., spaced between the first ejector assembly 206 and the second ejector assembly 208).

FIGS. 5-8 illustrate a retention operation of the example container retention and release apparatus 200. FIG. 5 is a cross-sectional view of the example container retention and release apparatus 200 and the container 300 taken along 5-5 of FIG. 3A. FIG. 5 illustrates the example container retention and release apparatus 200 in an unlatched position 500 prior to coupling to the container 300. In the unlatched position 500, the piston 406 is in a first piston position 502 (e.g., a first piston stroke position). To move the piston 406 to the first piston position 502, the energy source 112 (and/or another energy source) provides energy (e.g., pressurized fluid) to the piston 406 to cause the piston 406 to move in a first direction 504 (e.g., a downward direction in the orientation of FIG. 5). In particular, the piston 406 slides within the bore 424 of the post 404. Thus, when the energy source 112 provides energy to the piston 406, the energy imparts a force to the piston 406 against the force of the piston biasing element 434. Specifically, in the first piston position 502, the piston biasing element 434 is in a compressed condition (e.g., a fully compressed condition). For example, the piston 406 is positioned adjacent the support plate 442 such that the enlarged portion 414a of the piston 406 is positioned away from the lock 402. Thus, moving the piston 406 to the first piston position 502 causes the enlarged portion 414a (e.g., the piston head) of the piston 406 to disengages the lock 402.

To retain to the lock 402 coupled to the post 404, the collar 408 is biased to a first collar position 506. Specifically, the collar biasing element 454 biases the collar 408 to the first collar position (e.g., the collar biasing element 454 extends to a fully extended position). Thus, collar 408 retains the first lock 410 in the first slot 420 and the second lock 412 in the second slot 422 when the collar 408 is in the first collar position 506. When the post 404 does not engage the cover 308, the cover biasing element 466 biases the cover 308 in a second direction 508 (e.g., an upward direction in the orientation of the FIG. 5) to the closed position 310. In the closed position 310, the cover biasing element 466 is in a fully extended condition.

Figure 6:
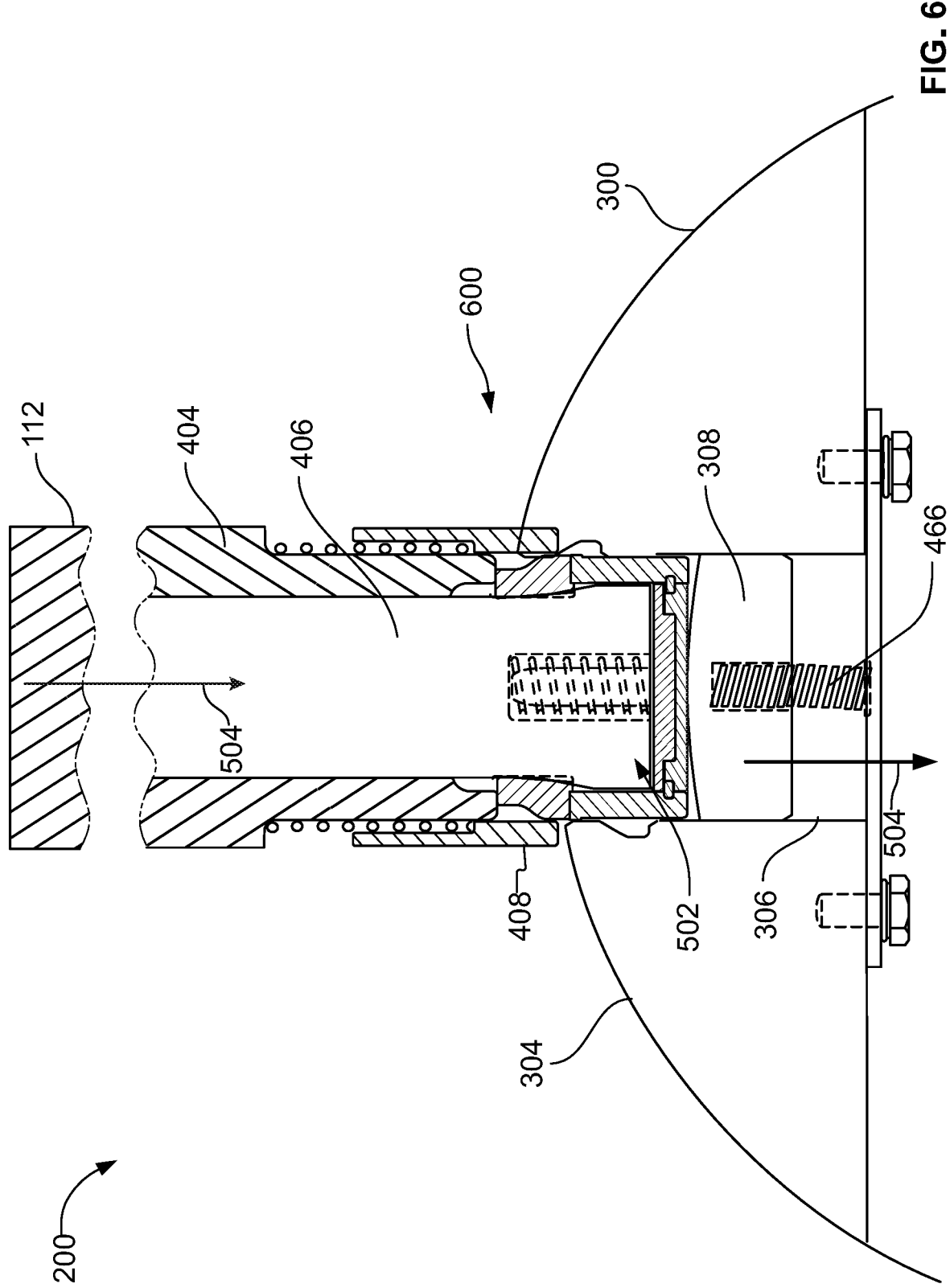

FIG. 6 illustrates the container retention and release apparatus 200 of FIG. 5 in an intermediate retention position 600. As the post 404 is inserted in the opening 306 of the container 300, the post 404 causes the cover 308 to move in the first direction 504 to compress the cover biasing element 466. The energy source 112 provides energy to maintain the piston 406 in the first piston position 502. As the opening 306 of the container 300 receives the post 404, the collar 408 engages the outer surface 304 of the container 300 and causes the collar 408 to move away from the first collar position 506 (FIG. 5) and, thereby, expose the lock 402 when the lock 402 is positioned in the opening 306.

Figure 7:
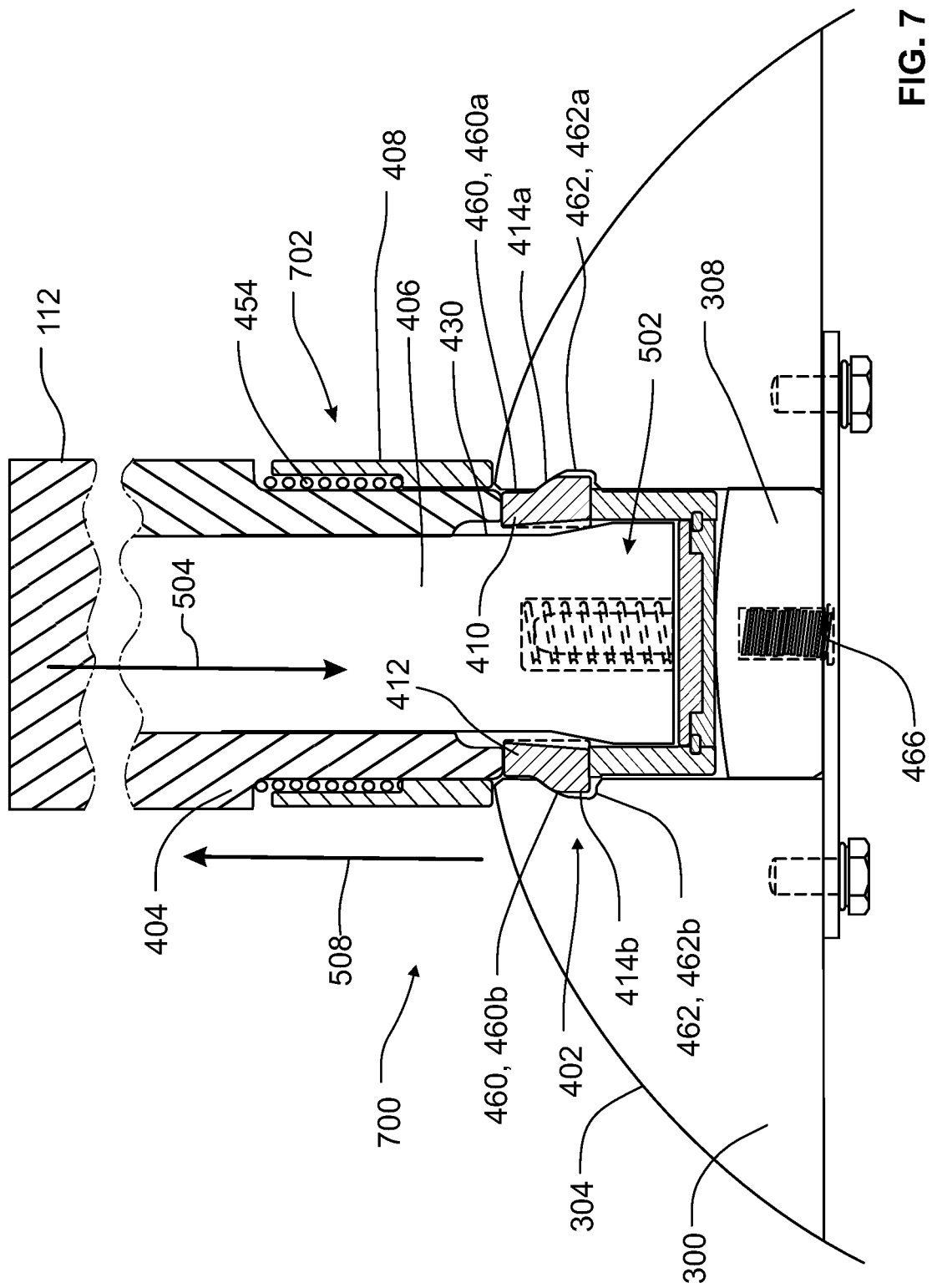

FIG. 7 illustrates the container retention and release apparatus 200 of FIG. 6 in a fully inserted position 700 prior to latching. As the post 404 is inserted in the opening 306, the engagement between the collar 408 and the outer surface 304 causes the collar 408 to move in the second direction 508 to a second collar position 702 to expose the lock 402 (e.g., the collar 408 is spaced away from the first lock 410 and the second lock 412). For example, in the second collar position 702, the collar biasing element 454 is in a fully compressed condition. Additionally, because the piston 406 is in the first piston position 502, the first lock 410 and the second lock 412 are aligned with the body 430 of the piston 406, which allows the first lock 410 and the second lock 412 to move (e.g., swivel in the first slot 420 and the second slot 422, respectively) as the first lock 410 moves along the first protrusion 460a of the opening 306 and the second lock 412 moves along the second protrusion 460b of the opening 306. In the fully inserted position 700, the first recess 462a of the opening 306 receives the enlarged portion 414a of the first lock 410 and the second recess 462b of the opening 306 receives the enlarged portion 414a of the second lock 412.

Figure 8:
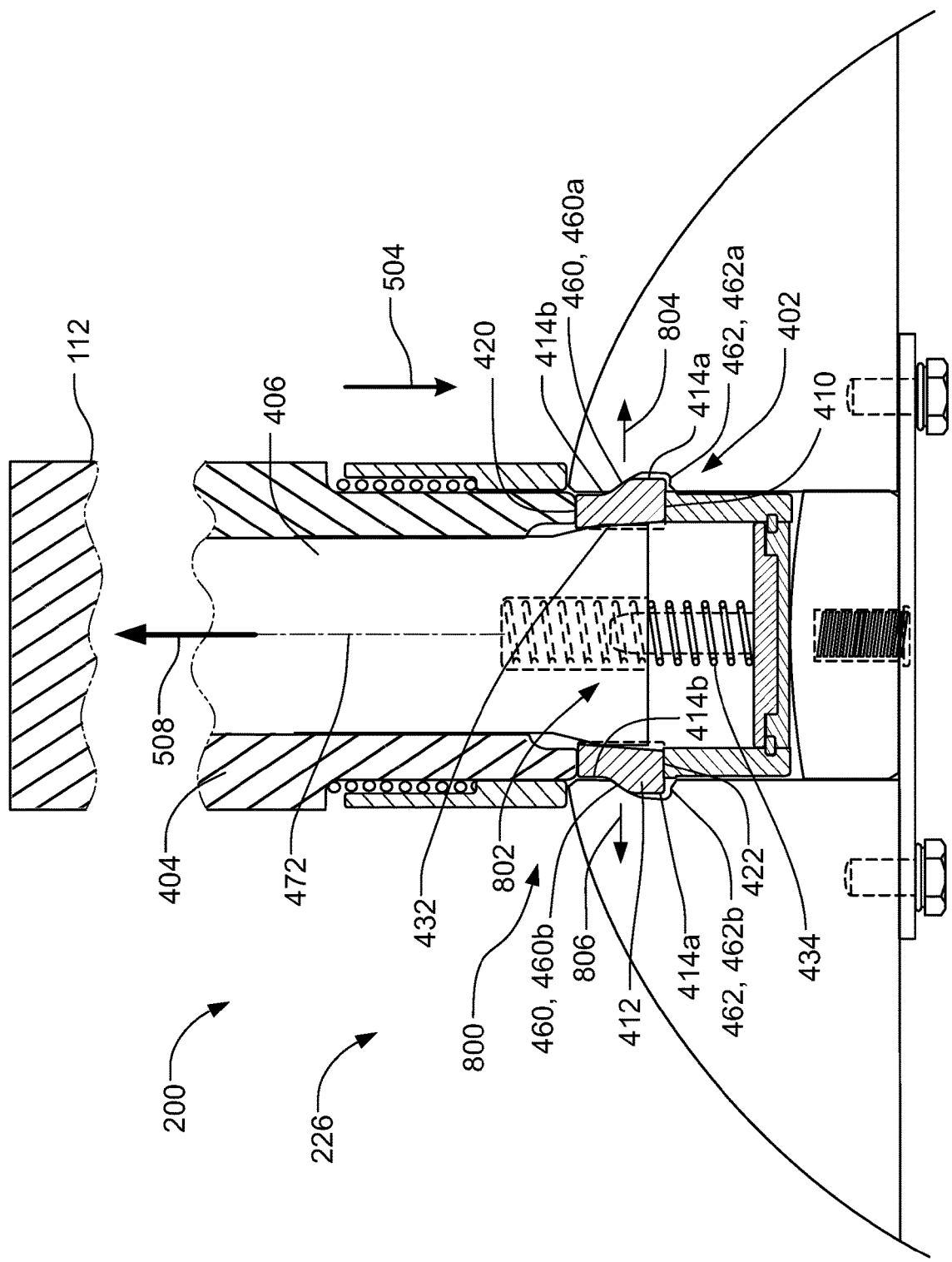

FIG. 8 illustrates the container retention and release apparatus 200 of FIG. 7 in a latched position 800. To move the lock 402 to the latched position 800, the energy source 112 removes energy (e.g., pressurized fluid) from the piston 406. In turn, the piston biasing element 434 causes the piston 406 to move in the second direction 508 to a second piston position 802 (e.g., a second stroke position). For example, the piston biasing element 434 moves to a fully expanded position. In the second piston position 802, the piston head 432 activates the lock 402. To activate the lock 402, the piston head 432 biases the first lock 410 into engagement with the first protrusion 460a of the opening 306 and biases the second lock 412 into engagement with the second protrusion 460b of the opening 306. Specifically, the piston head 432 imparts lateral forces to the first lock 410 and the second lock 412 in directions away from (e.g., perpendicular to) the longitudinal axis 472. Specifically, the piston head 432 causes the first lock 410 to move or shift in a first lateral direction 804 relative to the first slot 420 and into engagement with the first protrusion 460a (e.g., the reduced portion 414b engages the first protrusion 460a and the enlarged portion 414a is located in the first recess 462a). Likewise, the piston head 432 causes the second lock 412 to move or shift in a second lateral direction 806 relative to the second slot 422 and into engagement with the second protrusion 460b (e.g., the reduced portion 414b engages the second protrusion 460b and the enlarged portion 414a is located in the second recess 462b). Engagement between the first lock 410 and the first protrusion 460a generates a first clamping or holding force and engagement between the second lock 412 and the second protrusion 460b generates a second clamping or holding force. In the latched position 800, the retention apparatus 226 retains or constrains the container 300 when captively carried in-flight.

Figure 9:
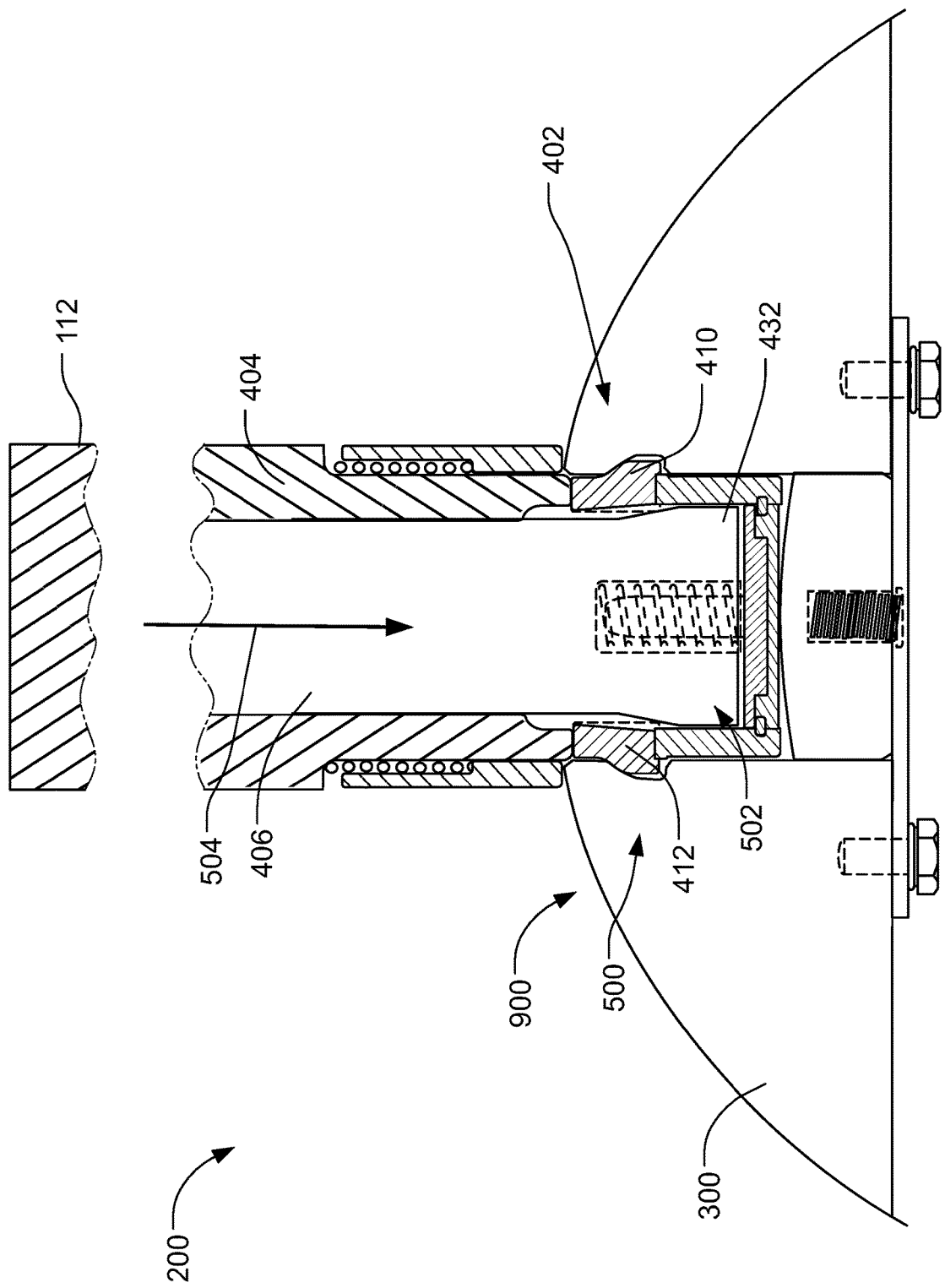
Figure 10:
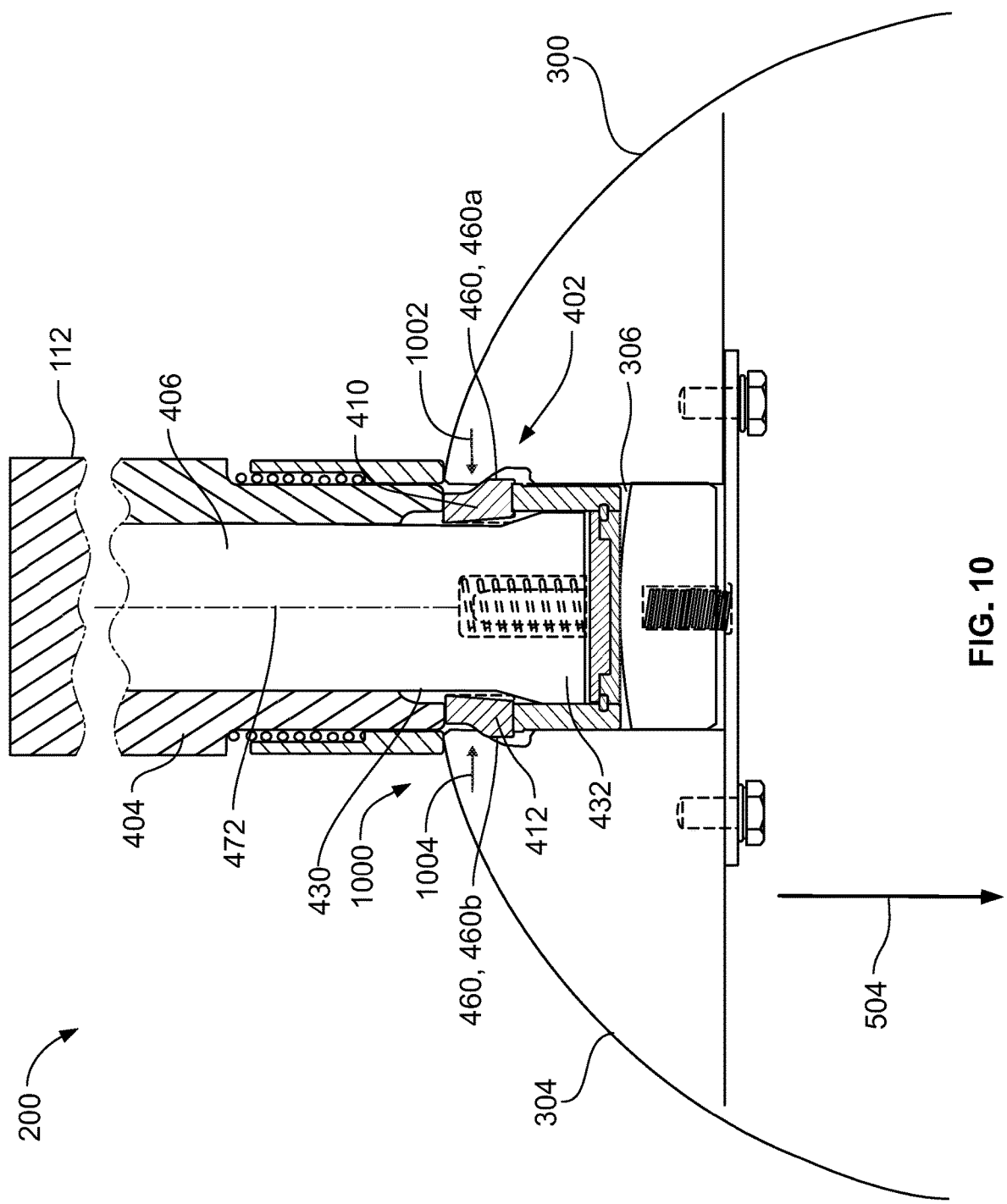

FIGS. 9-11 illustrate a release operation of the example container retention and release apparatus 200. FIG. 9 is a cross-sectional view of the container retention and release apparatus 200 in a first intermediate release position 900. Referring to FIG. 9, to release the container 300 from the latched position 800 of FIG. 8, the lock 402 is moved to the unlatched position 500. To move the lock to the unlatched position 500, the energy source 112 provides energy to the piston 406 to cause the piston to move in the first direction 504 to the first piston position 502. In this manner, the piston head 432 releases (e.g., disengages or moves away from) the first lock 410 and the second lock 412.

FIG. 10 illustrates the retention and release apparatus 200 of FIG. 9 in a second intermediate release position 1000. After the lock 402 is moved to the unlatched position 500, the energy source 112 causes the first ejector assembly 206 (FIGS. 2A, 2B) and the second ejector assembly 208 (FIGS. 2A, 2B) to move toward the deployed position 204 to move the container 300 in the first direction 504 away from the retention and release apparatus 200. As the first ejector assembly 206 and the second ejector assembly 208 move to the deployed position 204 (FIG. 2B), the container 300 slides relative to the post 404 such that the container 300 moves away from the post 404 and causes the post 404 to withdraw from the opening 306. As the container 300 moves away from the post 404, the first protrusion 460a of the opening 306 causes the first lock 410 to move or shift toward the piston 406 and the second protrusion 460b of the opening 306 causes the second lock 412 to move toward the piston 406. The body 430 of the piston 406 allows (e.g., provides clearance to enable) the first lock 410 and the second lock 412 to move in lateral directions 1002, 1004, respectively, toward the longitudinal axis 472.

FIG. 11 illustrates the retention and release apparatus 200 of FIG. 9 in a release position 1100. After the post 404 is withdrawn from the opening 306 of the container 300, the collar biasing element 454 biases the collar 408 to the first collar position 506 to retain the first lock 410 and the second lock 412. The cover biasing element 466 causes the cover 308 to move the closed position 310. In the closed position 310, an outer surface 1102 of the cover 308 is substantially flush relative to the outer surface 304 of the container 300. In other words, the outer surface 1102 of the cover 308 defines a portion of the outer surface 304 of the container 300 when the cover 308 is in the closed position 310.

Figure 12A:
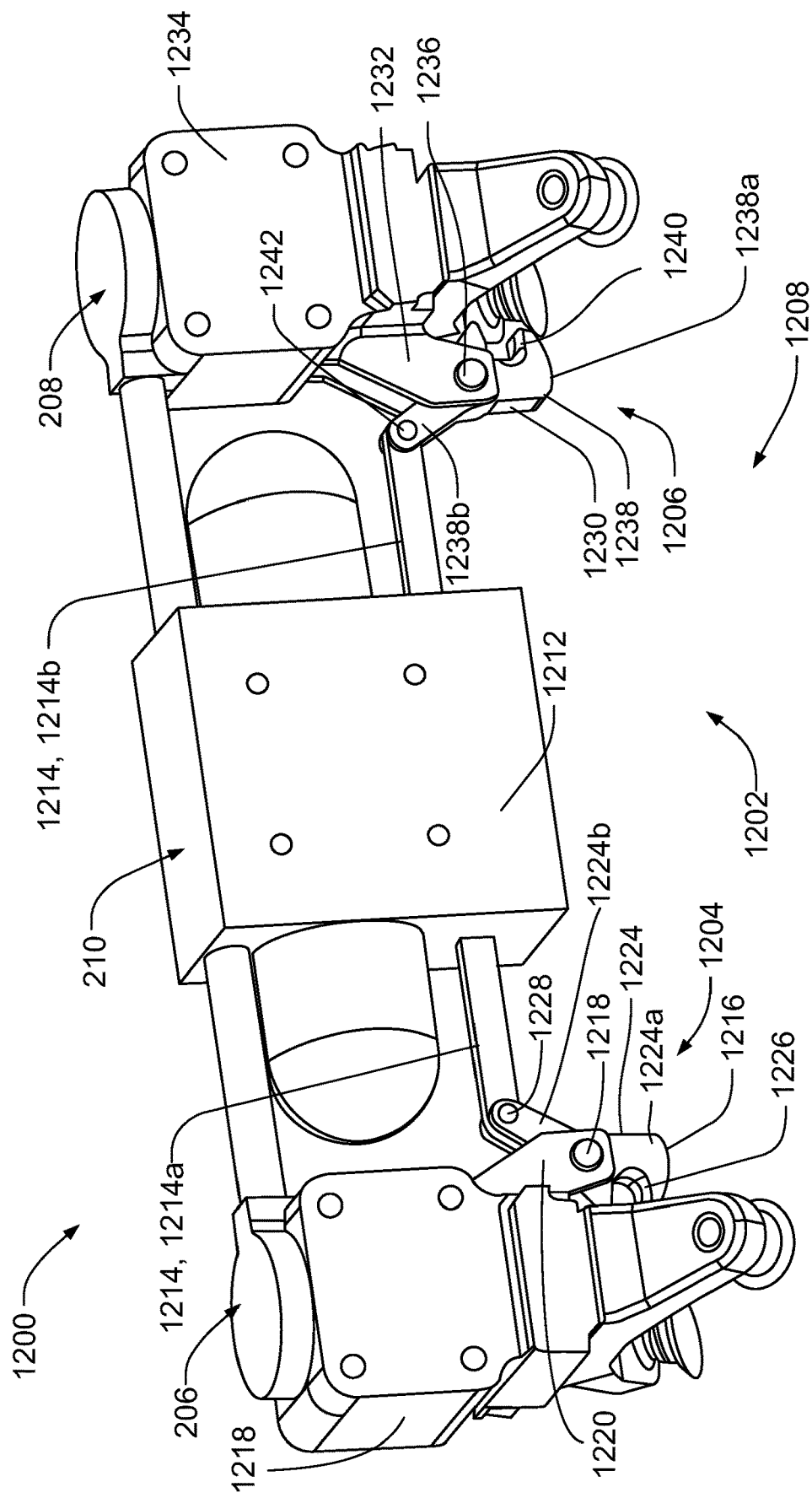
FIG. 12A is a perspective view of another example container retention and release apparatus disclosed herein having an example latch system shown in an example latched position.
Figure 12B:
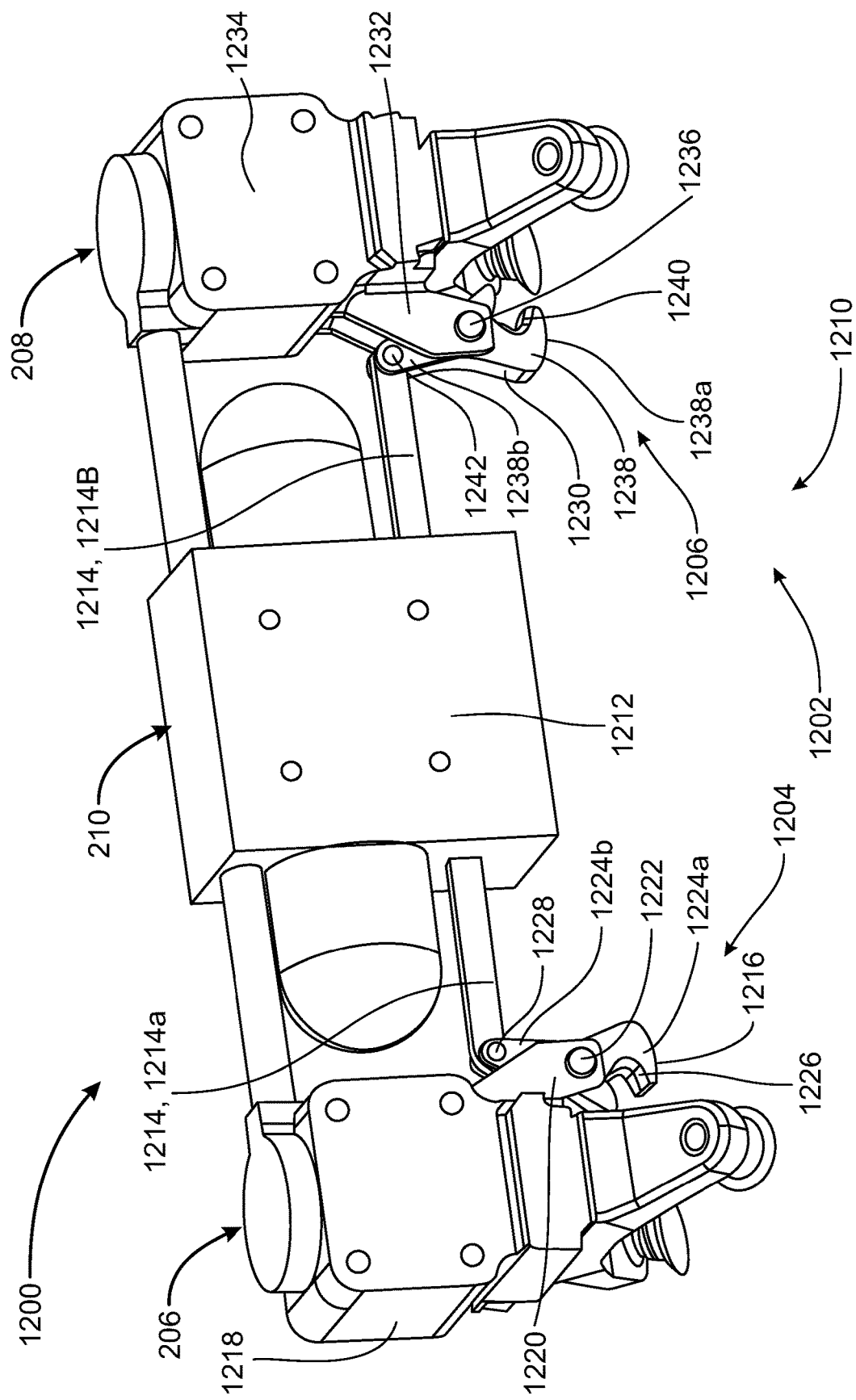
FIG. 12B is a perspective view of the example container retention and release apparatus disclosed herein showing the example latch system in an example unlatched position.

FIGS. 12A and 12B are perspective views of another example container retention and release apparatus 1200 disclosed herein. Those components of the example container retention and release apparatus 1200 of FIGS. 12A and 12B that are substantially similar or identical to the components of the container retention and release apparatus 200 described above and that have functions substantially similar or identical to the functions of those components will not be described in detail again below. Instead, the interested reader is referred to the above corresponding descriptions. To facilitate this process, identical reference numbers will be used for like structures. For example, to move the container retention and release apparatus 1200 between a stored position (e.g., the stored position 202 shown in FIG. 2A) and a deployed position (e.g., the deployed position 204 shown in FIG. 2B), the container retention and release apparatus 1200 of the illustrated example includes a first ejector assembly 206, a second ejector assembly 208, and an energy source 210.

To retain or constrain a container, the container retention and release apparatus 1200 of the illustrated example includes a retention apparatus 1202. The retention apparatus 1202 that is different than of the retention apparatus 226 of the container retention and release apparatus 200 of FIGS. 2A and 2B. The retention apparatus 1202 of the illustrated example is a dual retention apparatus. For example, the retention apparatus 1202 includes a first retainer 1204 and a second retainer 1206. The second retainer 1206 is identical (e.g., a mirror image) in both structure and function to the first retainer 1204. For brevity and clarity, the first retainer 1204 will be discussed in conjunction with the second retainer 1206. Each of the first retainer 1204 and the second retainer 1206 cooperate to retain and release a container. However, in some examples, the container retention and release apparatus 1200 can include only one of the first or second retainers 1204 or 1206.

FIG. 12A shows the retention apparatus 1202 in a latched position 1208. FIG. 12B shows the retention apparatus in an unlatched position 1210. To move the retention apparatus 1202 between the latched position 1208 and the unlatched position 1210, the container retention and release apparatus 200 includes a drive system 1212. The drive system 1212 includes a drive and/or a transmission 1214 to operatively couple the drive system 1212 and the retention apparatus 1202. The drive system 1212 includes a drive (e.g., a motor, an actuator, a linear actuator, a stepper motor, a rotary actuator, etc.) to move the retention apparatus 1202 via the transmission 1214.

Referring to FIGS. 12A and 12B, the first retainer 1204 includes a first latch 1216. The first latch 1216 is coupled to a first cylinder 1218 of the first ejector assembly 206 via a first bracket 1220 formed with the first cylinder 1218. The first latch 1216 is pivotally coupled to the first bracket 1220 about a first pivot 1222 (e.g., via a first pin, a bushing, a bearing, etc.). The first latch 1216 includes a first body 1224 having a first hook 1226 at a first end 1224a of the first body 1224. A second end 1224b of the first body 1224 has a yoke or clevis end to receive a first link 1214a (e.g., a bar) of the transmission 1214. A pin 1228 pivotally couples the second end 1224b of the first body 1224 to the first link 1214a of the transmission 1214.

The second retainer 1206 includes a second latch 1230. The second latch 1230 is coupled to a second cylinder 1234 of the second ejector assembly 208 via a second bracket 1232 formed with the second cylinder 1234. The second latch 1230 is pivotally coupled to the second bracket 1232 about a second pivot 1236 (e.g., via a second pin, a bushing, a bearing, etc.) The second latch 1230 of the illustrated example includes a second body 1238 having a second hook 1240 at a first end 1238a of the second body 1238. A second end 1238b of the second body 1238 has a yoke or clevis end to receive a second link 1214b (e.g., a bar) of the transmission 1214. A second pin 1242 pivotally couples the second end 1238b of the second body 1238 to the second link 1214b of the transmission 1214. To move the first latch 1216 and the second latch 1230 between the latched position 1208 and the unlatched position 1210, the drive, via the transmissions 1214, moves or toggles the first latch 1216 about the first pivot 1222 and the second latch 1230 about the second pivot 1236 between the latched position 1208 and the unlatched position 1210.

FIG. 13A is a perspective view of a container 1300 that can be retained by the container retention and release apparatus 1200 of FIGS. 12A and 12B. The container 1300 of the illustrated example is a store or weapon (e.g., the container 102 of FIG. 1A). The container 1300 includes a body 1302 having a polygonal cross-sectional shape (e.g., a diamond shape). The body 1302 of the illustrated example includes a first opening 1304a (e.g., an internal receptacle or internal to the OML) and a second opening 1304b (e.g., an internal receptacle or internal to the OML) to receive respective ones of the first and second retainers 1204, 1206 of the retention apparatus 1202 of FIGS. 12A and 12B. For example, the container 1300 of the illustrated example includes the first and second openings 1304a, 1304b. Each of the first opening 1304a and the second opening 1304b includes a cover 1306. In some examples, the openings 1304a-b do not include the cover 1306. In some examples, the first opening 1304a and the second opening 1304b and/or the cover 1306 can be coated with a radar absorbent material to reduce detectability by radar. The first opening 1304a and the second opening 1304b of the illustrated example are positioned or located on an edge 1307 (e.g., an interface) between a first side 1307a of the container 1300 and a second side 1307b of the container 1300.

FIG. 13B is a cross-sectional view of the first opening 1304a of FIG. 13A. The cover 1306 is movably coupled relative to the body 1302 of the container 1300. The cover 1306 is movable between an open position to receive a respective one of the first and second retainers 1204, 1206 when the container 1300 is coupled to the container retention and release apparatus 1200 and a closed position when the container 1300 is released from the container retention and release apparatus 1200. In the closed position, an outer surface 1308 of the cover 1306 is flush relative to an outer surface 1310 (e.g., an exterior surface) of the body 1302. To this end, the first opening 1304a does not affect an aerodynamic performance or characteristic of the container 1300 when the container 1300 is released from the container retention and release apparatus 1200. The cover 1306 is biased toward the closed position via one or more biasing elements 1312. The biasing elements 1312 are positioned between a first spring seat 1314 and a second spring seat 1316. The first spring seat 1314 includes apertures or bores 1318 formed on an inner surface 1320 of the cover 1306 that receive respective first ends 1312a of the biasing elements 1312. The second spring seat 1316 is a support plate that includes recesses 1324 to receive respective second ends 1312b of the biasing elements 1312.

Figure 14A:
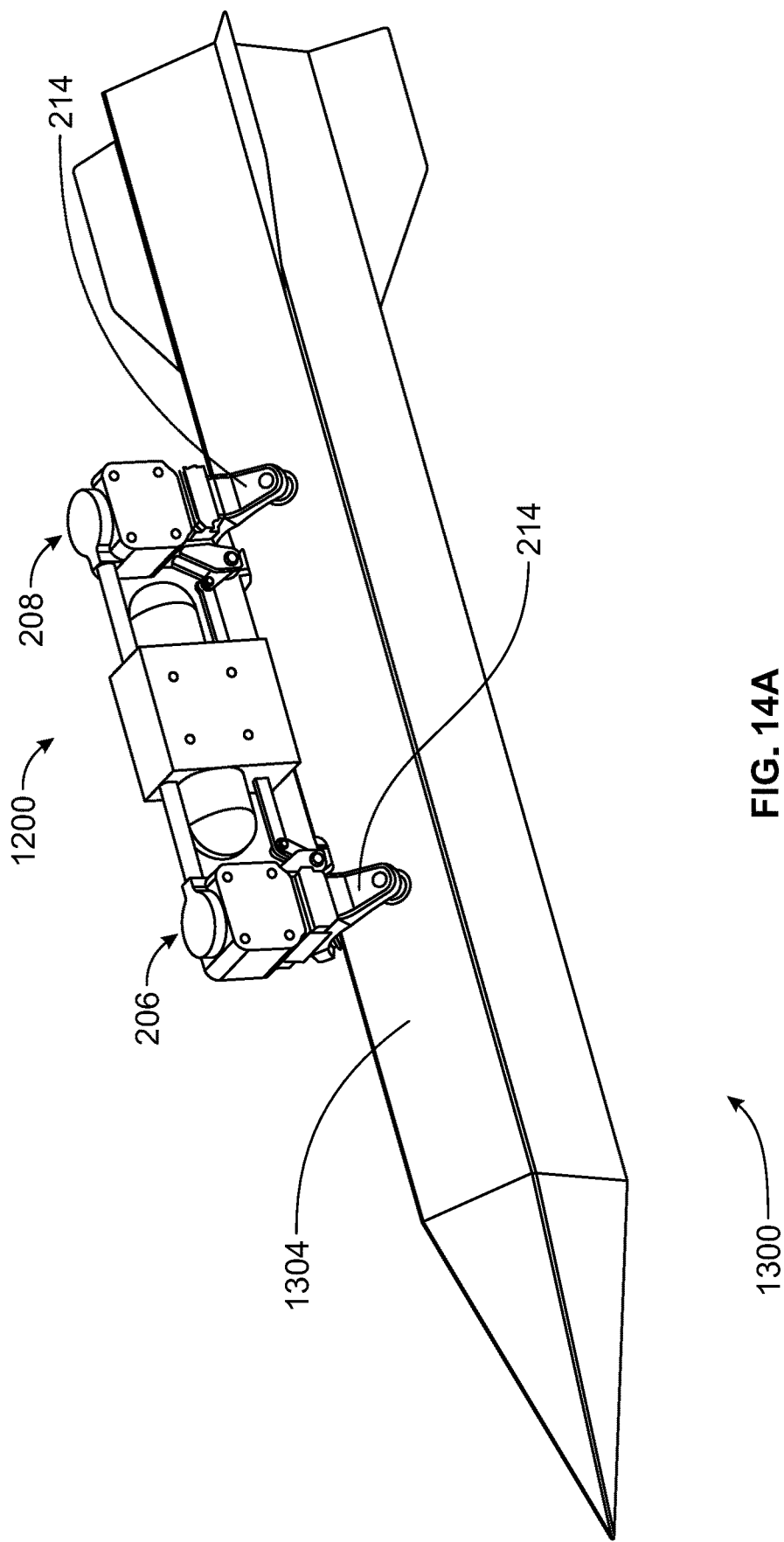
FIG. 14A is a perspective view of the example container of FIGS. 13A and 13B coupled to the example container retention and release apparatus of FIGS. 12A and 12B.
Figure 14B:
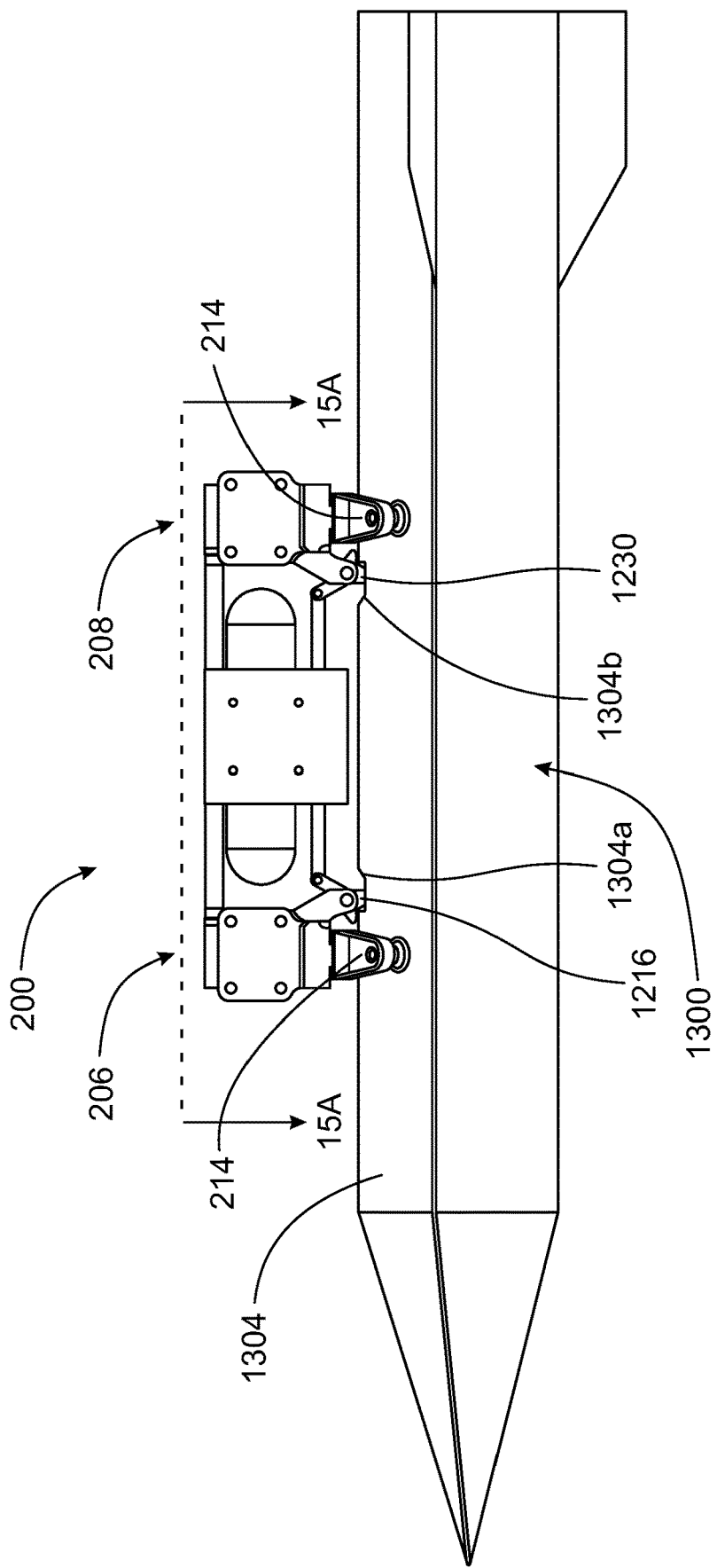
FIG. 14B is a side view of the example container and the example container retention and release apparatus of FIG. 14A.

FIG. 14A is a perspective view of the example container retention and release apparatus 1200 of FIGS. 12A and 12B coupled to the container 1300 of FIG. 13A. FIG. 14B is a side view of FIG. 14A. When the container 1300 is coupled to the container retention and release apparatus 1200, a swaybrace 214 of the first ejector assembly 206 and a swaybrace 214 of the second ejector assembly 208 engage the outer surface 1310 of the container 1300. For example, the swaybrace 214 engages an outer mold line (OML) of the container 1300. Additionally, the first and second openings 1304a, 1304b receive the retention apparatus 1202. For example, the retention apparatus 226 engages the container 300 at an interior of the OML.

FIG. 15A is a cross-sectional view taken along line 15A-15A of FIG. 14B. FIG. 15B is an enlarged, perspective view of the first opening 1304a of FIG. 15A. In the latched position 1208, the first opening 1304a receives the first retainer 1204 and the second opening 1304b receives the second retainer 1206. For example, the drive system 1212 activates to move the first retainer 1204 and the second retainer 1206 to the latched position 1208 via the transmission 1214. For example, the drive system 1212 moves the first link 1214a in a first lateral direction 1502 (e.g., away from the first ejector assembly 206) to cause the first hook 1226 to rotate about the first pivot 1222 in first rotational direction 1504 (e.g., a clockwise direction) and moves the second link 1214b in a second lateral direction 1506 (e.g., away from the second ejector assembly 208) to cause the second hook 1240 to rotate about the second pivot 1236 in a second rotational direction 1508 (e.g., a counterclockwise direction). Thus, the first link 1214a and the second link 1214b are moved toward each other to latch the retention apparatus 1202. Additionally, as the first and second retainers 1204, 1206 rotate to the latched position 1208, the first retainer 1204 causes the cover 1306 of the first opening 1304a and the second retainer 1206 causes the cover 1306 of the second opening 1304b to move to open positions 1510. The first hook 1226 of the first retainer 1204 engages a first structure or lip 1512 formed in the first opening 1304a and the second hook 1240 of the second retainer 1206 engages a second structure or lip 1514 formed in the second opening 1304b.

Figure 16:
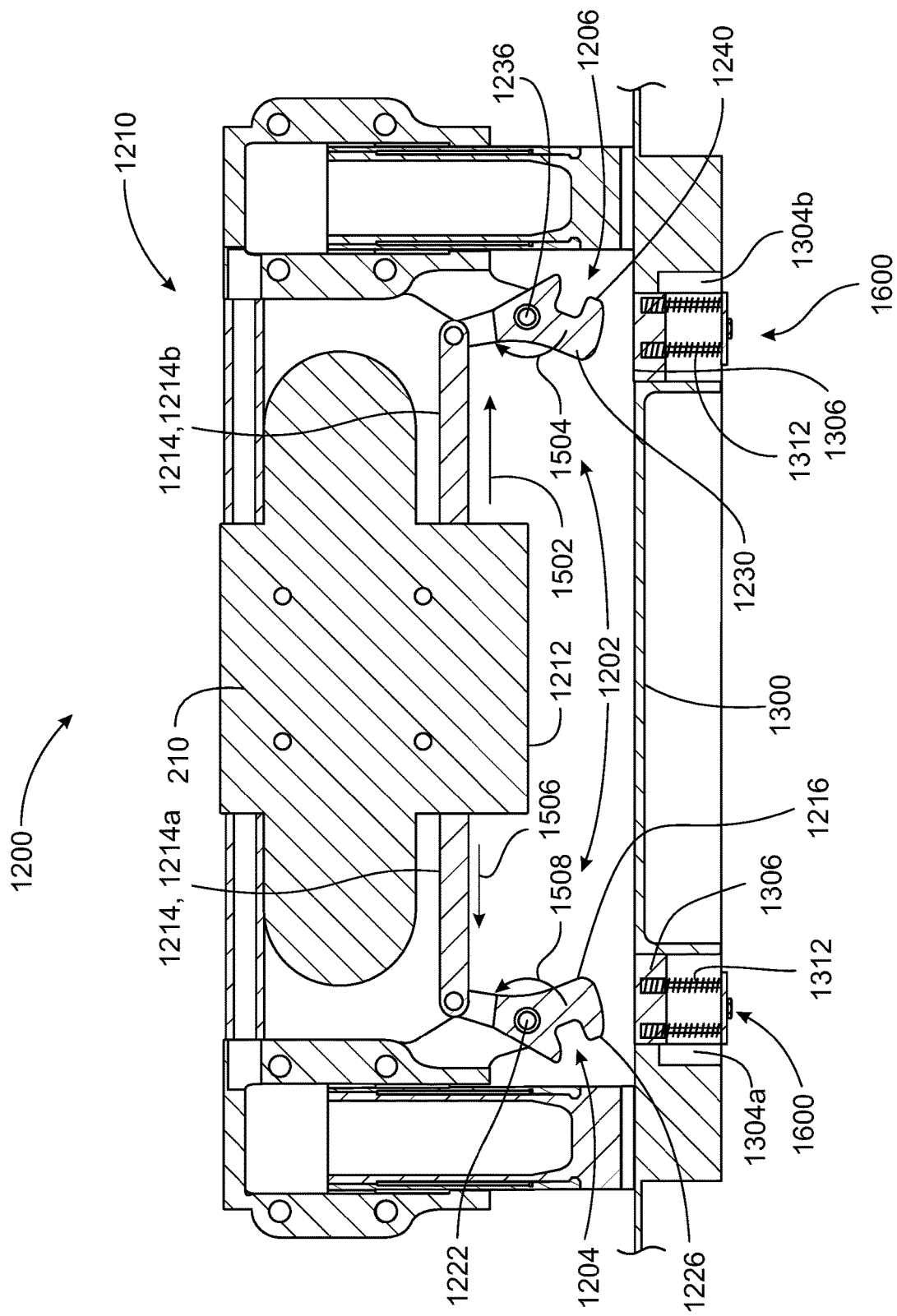
FIG. 16 is a cross-sectional view similar to FIG. 15A, but showing the example latch system in an example unlatched position.

FIG. 16 is a cross-sectional view similar to FIG. 15A but showing the retention apparatus 1202 in the unlatched position 1210. To release the container 1300, the drive system 1212 moves the first link 1214a in the second lateral direction 1506 (e.g., opposite the first lateral direction 1502 of FIG. 15A) to cause the first retainer 1204 to rotate in the second rotational direction 1508 (e.g., a counterclockwise direction) about the first pivot 1222 and moves the second link 1214b in the first lateral direction 1502 (e.g., opposite the second lateral direction 1506 of FIG. 15A) to cause the second retainer 1206 to rotate in the first rotational direction 1504 (e.g., a clockwise direction) about the second pivot 1236. Thus, the first link 1214a and the second link 1214b are moved away from each other to unlatch the retention apparatus 1202. Rotation of the first and second retainers 1204, 1206 in the respective first and second rotational directions 1508, 1504, respectively, causes the first and second retainers 1204, 1206 to withdraw from the respective first and second openings 1304a, 1304b. The biasing elements 1312 cause the cover 1306 of the first and second openings 1304a, 1304b to move to a closed position 1600.

Figure 17:
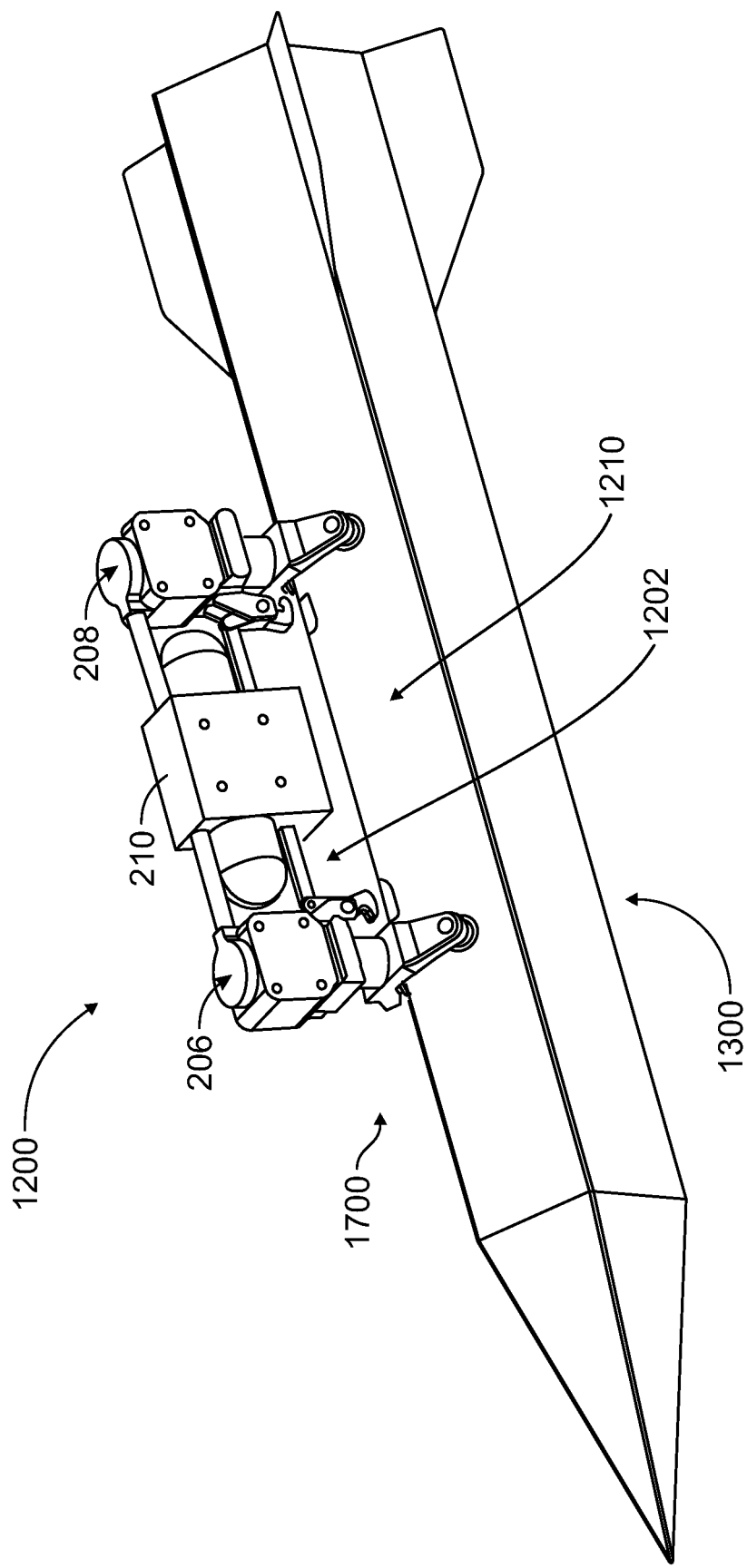
FIG. 17 is a perspective view of the example container retention and release apparatus of FIGS. 12A and 12B in a deployed position and the example container of FIGS. 13A and 13B.

FIG. 17 is a perspective view of the container retention and release apparatus 1200 and the container 1300 shown in a deployed position 1700 to release the container 1300. After the retention apparatus 1202 is in the unlatched position 1210, the energy source 210 causes the first ejector assembly 206 and the second ejector assembly 208 to move to a deployed position 1700 to move the container 1300 away from the container retention and release apparatus 1200.

Figure 20:
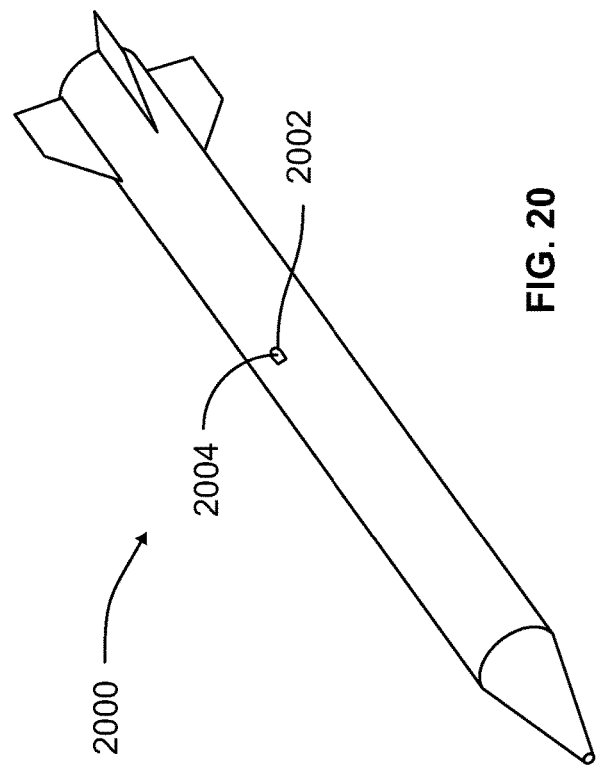
FIGS. 18-20 are perspective views of other example containers that can be carried by the example container retention and release apparatus disclosed herein.
Figure 18:
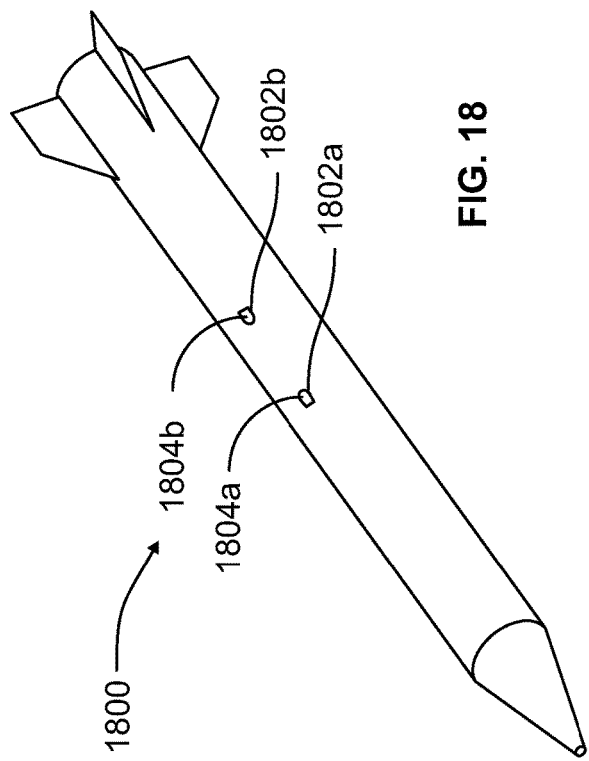
Figure 19:
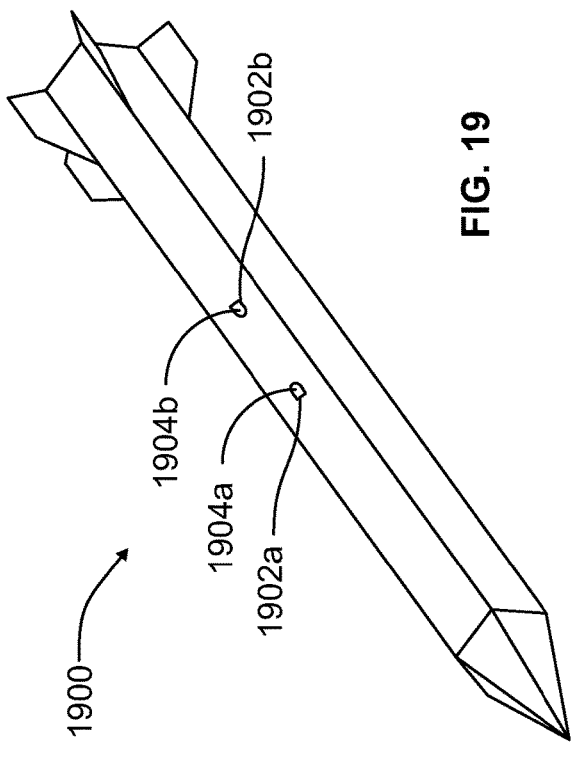

FIGS. 18-20 illustrate other example containers 1800-2000 that can be retained by the container retention and release apparatus 200, 1200 disclosed herein. Each of the containers 1800-2000 includes one or more openings 1802a, 1802b, 1902a, 1902b, 2002 having movable covers 1804a, 1804b, 1904a, 1904b, 2004.

Although each example container retention and release apparatus disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. For example, one or more features (e.g., the retention apparatus 226) of one example container retention and release apparatus can be combined with another feature (e.g., the retention apparatus 1202) of another example container retention and release apparatus disclosed herein.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

From the foregoing, it will be appreciated that example methods, apparatus and articles of manufacture improve container aerodynamic drag performance or characteristics by eliminating container lugs, receptacles and/or hangers. As a result, containers can have reduced store weight, increased range, and/or increased payload.

At least some of the aforementioned examples include one or more features and/or benefits including, but not limited to, the following:

In some examples, a container retention and release apparatus includes an example container retention and release apparatus includes a swaybrace to engage an exterior surface of a container. A latch is to attach to an internal receptacle of the container to retain the container. The latch is movable between a latched position to retain the container and an unlatched position to release the container. A drive is to move the latch between the latched position and the unlatched position.

In some examples, the latch includes a post having a lock carried by a post.

In some examples, the drive includes a piston slidably coupled relative to the post, the piston to move to a first position to engage the lock and cause the lock to engage a shoulder formed in the internal receptacle of the container when the latch is in the latched position, the piston to move to a second position to allow the lock to disengage or release the shoulder when the latch is in the unlatched position.

In some examples, further including a collar carried by the post, the collar to retain the lock coupled to the post when the latch is in the unlatched position and the post is removed from the internal receptacle.

In some examples, the latch includes a hook to engage the internal receptacle when the latch is in the latched position, the hook to release the receptacle when the latch is in the unlatched position.

In some examples, the drive includes a transmission to couple the hook and a motor, the motor to cause the hook to pivot between a first position when the latch is in the latched position and a second position when the latch is in the unlatched position.

In some examples, the latch includes a first latch and a second latch, and the internal receptacle includes a first internal receptacle and a second internal receptacle, the first latch to interface with the first internal receptacle and the second latch to interface with the second internal receptacle.

In some examples, the first latch includes a first hook and the second latch includes a second hook spaced from the first hook.

In some examples, a container retention and release apparatus includes a swaybrace to engage an exterior surface of a container. A post is to be at least partially received by an internal receptacle of the container. A lock is carried by the post. The lock being movable between a latched position to retain the container and an unlatched position to release the container. A piston is slidably coupled relative to the post. The piston to move the lock between the latched position and the unlatched position.

In some examples, the lock is to engage a shoulder formed in the internal receptacle when the lock is in the latched position.

In some examples, the piston is to move between a first stroke position to allow the lock to move to the unlatched position and a second stroke position to move the lock to the latched position In some examples, the piston includes a first portion having a first diameter and a second portion adjacent the first portion having a second diameter different than the first diameter.

In some examples, the second portion is to cause the lock to engage the shoulder of the receptacle when the piston is in the second stroke position and the first portion is to allow the lock to release the shoulder of the internal receptacle when the piston is in the first stroke position.

In some examples, the container is to bias the lock to the unlatched position when the piston is at the first stroke position.

In some examples, further including a collet movably coupled to an outer surface of the post, the collet to retain the lock coupled to the post when the latch is in the unlatched position and the post is removed from the internal receptacle.

In some examples, a method includes retaining a container to a container retention and release apparatus by engaging an exterior surface of a container via a swaybrace and engaging a shoulder of an internal receptacle of the container via a latch spaced from the swaybrace; and releasing the container by moving the latch from a latched position at which the latch engages the shoulder of the internal receptacle of the container and an unlatched position at which the latch is disengaged from the shoulder of the internal receptacle.

In some examples, the method of releasing the container includes operating a first drive to move the latch between the latched position and the unlatched position and operating a second drive different than the first drive to release the container from the swaybrace.

In some examples, the retaining of the container by engaging the shoulder of the internal receptacle includes biasing a piston at least partially inserted in the internal receptacle to a first position to cause an enlarged diameter portion of the piston to bias a lock into engagement with the shoulder of the internal receptacle.

In some examples, the moving of the latch from the latched position to the unlatched position includes moving the piston from the first position to a second position to cause a reduced diameter portion of the piston to allow the lock to disengage the shoulder of the internal receptacle.

In some examples, the moving the latch between the latched position and the unlatched position includes moving a hook into engagement with the shoulder of the internal receptacle and withdrawing to hook from the internal receptacle to disengage the shoulder of the internal receptacle.

In some examples, a container retention and release apparatus includes a swaybrace to engage an exterior surface of a container. A first latch is to be at least partially received by a first internal receptacle of the container, and a second latch is to be at least partially received by a second internal receptacle of the container.

In some examples, the first latch includes a first hook and the second latch includes a second hook.

In some examples, the first hook engages a first shoulder of the first receptacle when the first hook is in a first latched position and the second hook engages a second shoulder of the second receptacle when the second hook is in a second latched position to retain the container.

In some examples, the first hook disengages the first shoulder of the first receptacle when the first hook is in a first unlatched position and the second hook disengages the second shoulder of the second receptacle when the second hook is in a second unlatched position to release the container.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A container retention and release apparatus comprising:
    a first ejector assembly having a first swaybrace and a second ejector assembly having a second swaybrace, the first ejector assembly being spaced apart from the second ejector assembly, the first swaybrace to engage a first portion of an exterior surface of a container and the second swaybrace to engage a second portion of the exterior surface of the container different than the first portion; and a retention apparatus to retain the container positioned between the first ejector assembly and the second ejector assembly, the retention apparatus including:
 a latch to attach to an internal receptacle of the container to retain the container, the latch movable between a latched position to retain the container and an unlatched position to release the container; and
 a drive to move the latch between the latched position and the unlatched position.

2. The apparatus of claim 1, wherein the latch includes a lock carried by a post.

3. The apparatus of claim 2, wherein the drive includes a piston slidably coupled relative to the post, the piston to move to a first position to engage the lock and cause the lock to engage a shoulder formed in the internal receptacle of the container when the latch is in the latched position, the piston to move to a second position to allow the lock to disengage or release the shoulder when the latch is in the unlatched position.

4. The apparatus of claim 2, further including a collar carried by the post, the collar to retain the lock coupled to the post when the latch is in the unlatched position and the post is removed from the internal receptacle.

5. The apparatus of claim 1, wherein the latch includes a hook to engage the internal receptacle when the latch is in the latched position, the hook to release the receptacle when the latch is in the unlatched position.

6. The apparatus of claim 5, wherein the drive is to cause the hook to pivot between a first position when the latch is in the latched position and a second position when the latch is in the unlatched position.

7. The apparatus of claim 1, wherein the latch includes a first latch and a second latch, and the internal receptacle includes a first internal receptacle and a second internal receptacle, the first latch to interface with the first internal receptacle and the second latch to interface with the second internal receptacle.

8. The apparatus of claim 7, wherein the first latch includes a first hook and the second latch includes a second hook spaced from the first hook.

9. A container retention and release apparatus comprising:
 a swaybrace to engage an exterior surface of a container;
 a post to be at least partially received by an internal receptacle of the container;
 a lock carried by the post, the lock being movable between a latched position to retain the container and an unlatched position to release the container;
 a piston slidably coupled relative to the post, the piston to move the lock between the latched position and the unlatched position;
 a collar slidably coupled to an outer surface of the post between a first collar position to retain the lock and a second collar position to release the lock; and
 a collar biasing element to bias the collar to the first collar position to retain the lock coupled to the post when the latch is in the unlatched position and the post is removed from the internal receptacle, the collar to move to the second collar position via engagement with the container when the post is at least partially received by the internal receptacle of the container to release the latch when the latch is in the latched position.

10. The apparatus of claim 9, wherein the lock is to engage a shoulder formed in the internal receptacle when the lock is in the latched position.

11. The apparatus of claim 10, wherein the piston is to move between a first stroke position to allow the lock to move to the unlatched position and a second stroke position to move the lock to the latched position.

12. The apparatus of claim 11, wherein the piston includes a first portion having a first diameter and a second portion adjacent the first portion having a second diameter different than the first diameter.

13. The apparatus of claim 12, wherein the second portion is to cause the lock to engage the shoulder of the receptacle when the piston is in the second stroke position and the first portion is to allow the lock to release the shoulder of the internal receptacle when the piston is in the first stroke position.

14. A method including:
 retaining a container to a container retention and release apparatus by engaging an exterior surface of a container via a swaybrace and engaging a shoulder of an internal receptacle of the container via a lock spaced from the swaybrace;
 biasing the lock toward a latched position via a piston slidably coupled to a post supporting the lock when the lock is positioned in the receptacle;
 releasing the container by moving the lock from the latched position at which the lock engages the shoulder of the internal receptacle of the container to an unlatched position at which the lock disengages from the shoulder of the internal receptacle; and
 retaining the lock within the post via a collar slidably coupled to the post via a collar biasing element, the collar to retain the lock within the post in response to the lock being removed from the internal receptacle.

15. The method of claim 14, wherein releasing the container includes operating a first drive to move the lock between the latched position and the unlatched position and operating a second drive different than the first drive to release the container from the swaybrace.

16. The method of claim 14, wherein the retaining of the container by engaging the shoulder of the internal receptacle includes at least partially inserting the piston in the internal receptacle to a first position to cause an enlarged diameter portion of the piston to bias the lock into engagement with the shoulder of the internal receptacle.

17. The method of claim 16, wherein the moving of the lock from the latched position to the unlatched position includes moving the piston from the first position to a second position to cause a reduced diameter portion of the piston to allow the lock to disengage the shoulder of the internal receptacle.

18. A container retention and release apparatus comprising:
 a first ejector assembly having a first swaybrace and a second ejector assembly having a second swaybrace, the first ejector assembly being spaced apart from the second ejector assembly, the first swaybrace to engage a first portion of an exterior surface of a container and the second swaybrace to engage a second portion of the exterior surface of the container different than the first portion;
 a first latch to be at least partially received by a first internal receptacle of the container, the first latch being pivotally coupled to a first housing of the first ejector assembly; and
 a second latch to be at least partially received by a second internal receptacle of the container, the second latch being pivotally coupled to a second housing of the second ejector assembly.

19. The apparatus of claim 18, wherein the first latch includes a first hook and the second latch includes a second hook.

20. The apparatus of claim 19, wherein the first hook engages a first shoulder of the first receptacle when the first hook is in a first latched position and the second hook engages a second shoulder of the second receptacle when the second hook is in a second latched position to retain the container.

21. The apparatus of claim 20, wherein the first hook disengages the first shoulder of the first receptacle when the first hook is in the first unlatched position and the second hook disengages the second shoulder of the second receptacle when the second hook is in the second unlatched position to release the container.

22. The apparatus of claim 18, wherein the first latch pivots about a first pivot axis and the second latch pivots about a second pivot axis.

23. The apparatus of claim 22, wherein the first pivot axis is spaced from the second pivot axis, and the first pivot axis is parallel to the second pivot axis.

24. The apparatus of claim 18, wherein the first latch is pivotally coupled to the first housing via a first bracket and the second latch is pivotally coupled to the second housing via a second bracket.

\* \* \* \* \*